US012659564B2

(12) United States Patent (10) Patent No.: US 12,659,564 B2

Imamura (45) Date of Patent: Jun. 16, 2026

(54) CAMERA SYSTEM AND ATTACHMENT

(71) Applicant: FUJIFILM Corporation, Tokyo (JP)

(72) Inventor: Hibiki Imamura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/884,040

(22) Filed: Sep. 12, 2024

(65) Prior Publication Data

US 2025/0097558 A1 Mar. 20, 2025

(30) Foreign Application Priority Data

Sep. 15, 2023 (JP) ................................. 2023-150541

(51) Int. Cl.
H04N 23/55 (2023.01)
(52) U.S. Cl.
CPC .................................. H04N 23/55 (2023.01)
(58) Field of Classification Search
CPC ...................................................... H04N 23/55
USPC .......................................... 348/335; 396/164
See application file for complete search history.

(56) References Cited

U.S. PATENT DOCUMENTS

| | | | | |
|---|---|---|---|---|
| 2007/0025719 A1* | 2/2007 | Kashiwagi | ............. | G03B 17/02 |
| | | | | 396/6 |
| 2019/0208134 A1 | 7/2019 | Toriumi et al. | | |
| 2021/0227106 A1 | 7/2021 | Nakashima et al. | | |

FOREIGN PATENT DOCUMENTS

| | | |
|---|---|---|
| JP | S58-040732 U | 3/1983 |
| JP | 2000-056378 A | 2/2000 |
| JP | 2007-124035 A | 5/2007 |
| JP | 2009-025550 A | 2/2009 |
| JP | 2009-094563 A | 4/2009 |
| JP | 2014-049859 A | 3/2014 |
| JP | 3207709 U | 11/2016 |
| JP | 2019-056863 A | 4/2019 |
| JP | 2019-121859 A | 7/2019 |
| JP | 2021-113953 A | 8/2021 |

OTHER PUBLICATIONS

"Notice of Reasons for Rejection" Office Action issued in JP 2023-150541; mailed by the Japanese Patent Office on Oct. 15, 2024.
International Search Report and The Written Opinion of the International Searching Authority issued in PCT/JP2024/032441; mailed Dec. 3, 2024.
Office Action issued in JP 2023-150541; mailed by the Japanese Patent Office on Jul. 9, 2024.

* cited by examiner

*Primary Examiner* — Joel W Fosselman
(74) *Attorney, Agent, or Firm* — Studebaker Brackett PLLC

(57) ABSTRACT

A camera system includes a camera including a light emitting unit that is able to perform notification about information on the camera by means of light emission and an attachment that is mountable to the camera. The attachment functions as a finder used to check an imaging range of the camera in a state where the attachment is mounted to the camera and in a case where the attachment is mounted, an inside of a frame of the finder is irradiatable with light from the light emitting unit.

8 Claims, 16 Drawing Sheets

FIG. 3

CAMERA SYSTEM AND ATTACHMENT

CROSS REFERENCE TO RELATED APPLICATIONS

This application claims priority from Japanese Application No. 2023-150541, filed on Sep. 15, 2023, the entire disclosure of which is incorporated herein by reference.

BACKGROUND

1. Technical Field

The present disclosed technology relates to a camera system and an attachment.

2. Related Art

Described in JP2019-121859A is an optical device including an image formation optical system of which the focal length is changeable and a notification unit that notifies a user of information about the focal length of the image formation optical system. The notification unit changes, based on the focal length, a method of notifying the user of the information about the focal length.

Described in JP2009-025550A is a display mechanism of a digital camera that includes an accessory shoe and an autofocusing mechanism and that is switchable into a state in which manual focus adjustment can be performed, the display mechanism having a plurality of functions of displaying the result of determination on whether or not the camera is in focus in a case where an imaging mode of the camera is switched into a manual focusing mode. One of the functions is a function of displaying the result on a liquid crystal monitor on a rear surface and the other of the functions is a function of displaying the result by means of light emission of an LED, and an LED display unit is installed in the vicinity of the accessory shoe outside a camera body.

Disclosed in JP2014-049859A is a camera in which an optical finder, of which an optical axis is different from an optical axis of an imaging lens and through which a subject image is visually recognized in the form of a virtual image or a fluoroscopic rear image, is built or attachably and detachably provided. A display unit that displays the state of operation of the camera is provided at a portion of a lens barrel such that the display unit is visually recognized in the form of a subject image within the visual field of the optical finder.

SUMMARY

An embodiment according to the present disclosed technology provides a camera system in which light emitted by a light emitting unit is easily visually recognized and an attachment.

According to a first aspect of the present disclosed technology, there is provided a camera system including a camera including a light emitting unit that is able to perform notification about information on the camera by means of light emission and an attachment that is mountable to the camera. The attachment functions as a finder used to check an imaging range of the camera in a state where the attachment is mounted to the camera and in a case where the attachment is mounted, an inside of a frame of the finder is irradiatable with light from the light emitting unit.

A second aspect of the present disclosed technology provides the camera system according to the first aspect, in which a through-hole is formed in the attachment at a mounting portion with respect to the camera and the light from the light emitting unit passes through the through-hole, so that the inside is irradiatable with the light from the light emitting unit.

A third aspect of the present disclosed technology provides the camera system according to the first aspect, in which at least a portion of the attachment is formed of a light-transmitting material, so that the inside is irradiatable with the light from the light emitting unit.

A fourth aspect of the present disclosed technology provides the camera system according to the first aspect, in which the attachment includes a light guide member that guides the light from the light emitting unit by causing the light to propagate in the light guide member and the inside is irradiatable with the light from the light emitting unit via the light guide member.

A fifth aspect of the present disclosed technology provides the camera system according to the first aspect, in which the frame of the attachment is a guide used to check the imaging range and the attachment functions as a simple finder that does not include a lens.

A sixth aspect of the present disclosed technology provides the camera system according to the first aspect, in which the attachment has a second function different from a first function, the first function being a function as the finder.

A seventh aspect of the present disclosed technology provides the camera system according to the sixth aspect, in which the second function is a function as a stand on which the camera is placeable.

An eighth aspect of the present disclosed technology provides the camera system according to the seventh aspect, in which the camera is placeable on the stand in a posture in which an optical axis of the camera is inclined with respect to a horizontal direction.

A ninth aspect of the present disclosed technology provides the camera system according to the eighth aspect, in which the stand has such a shape that an inclination angle of the optical axis with respect to the horizontal direction is adjustable.

A tenth aspect of the present disclosed technology provides the camera system according to the ninth aspect, in which a height of the frame from a surface on which the stand is installed differs in a circumferential direction of the frame, so that the inclination angle is adjustable.

An eleventh aspect of the present disclosed technology provides the camera system according to the seventh aspect, in which the frame of the attachment is a guide used to check the imaging range, the attachment includes a plurality of supporting protrusions that serve as a plurality of support points at which the camera is supported in a case where the attachment is used as the stand, and the supporting protrusions are disposed on the frame.

A twelfth aspect of the present disclosed technology provides the camera system according to the first aspect, in which the camera has a communication function, and the light emitting unit functions as an indicator indicating that the camera is in communication.

A thirteenth aspect of the present disclosed technology provides the camera system according to the first aspect, in which the light emitting unit is disposed at a position at which light emitted by the light emitting unit is visually recognizable for a user in a state where the user looks through the finder mounted to the camera.

According to a fourteenth aspect of the present disclosed technology, there is provided an attachment mountable to a camera including a light emitting unit that is able to perform notification about information on the camera by means of light emission. The attachment functions as a finder used to check an imaging range of the camera in a state where the attachment is mounted to the camera and in a case where the attachment is mounted, an inside of a frame of the finder is irradiatable with light from the light emitting unit.

BRIEF DESCRIPTION OF THE DRAWINGS

FIG. 3 is an external view showing an example of a configuration of an accessory according to the embodiment.

DESCRIPTION OF EMBODIMENTS

An example of a camera according to an embodiment of the present disclosed technology will be described with reference to the accompanying drawings.

In the following description, for convenience of description, a front-rear direction (may also be referred to as a depth direction), a width direction, and a height direction of a camera 10 are represented by three arrows X, Y, and Z. First, the height direction is represented by the arrow Y, a direction along the arrow Y which is denoted by the arrow Y will be referred to as an upward direction of the camera 10, and a direction opposite to the upward direction will be referred to as a downward direction. The width direction is represented by the arrow X orthogonal to the arrow Y, a direction denoted by the arrow X will be referred to as a rightward direction of the camera 10, and a direction opposite to the rightward direction will be referred to as a leftward direction. The front-rear direction is represented by the arrow Z orthogonal to the arrow X and the arrow Y, a direction denoted by the arrow Z will be referred to as a forward direction of the camera 10, and a direction opposite to the forward direction will be referred to as a rearward direction. That is, a direction extending toward a subject along an optical axis K (refer to FIG. 3) of the camera 10 is the forward direction. In addition, in the following description, expressions using sides such as an upper side, a lower side, a left side, a right side, a front side, and a rear side have the same meanings as the expressions using the directions.

Figure 1:
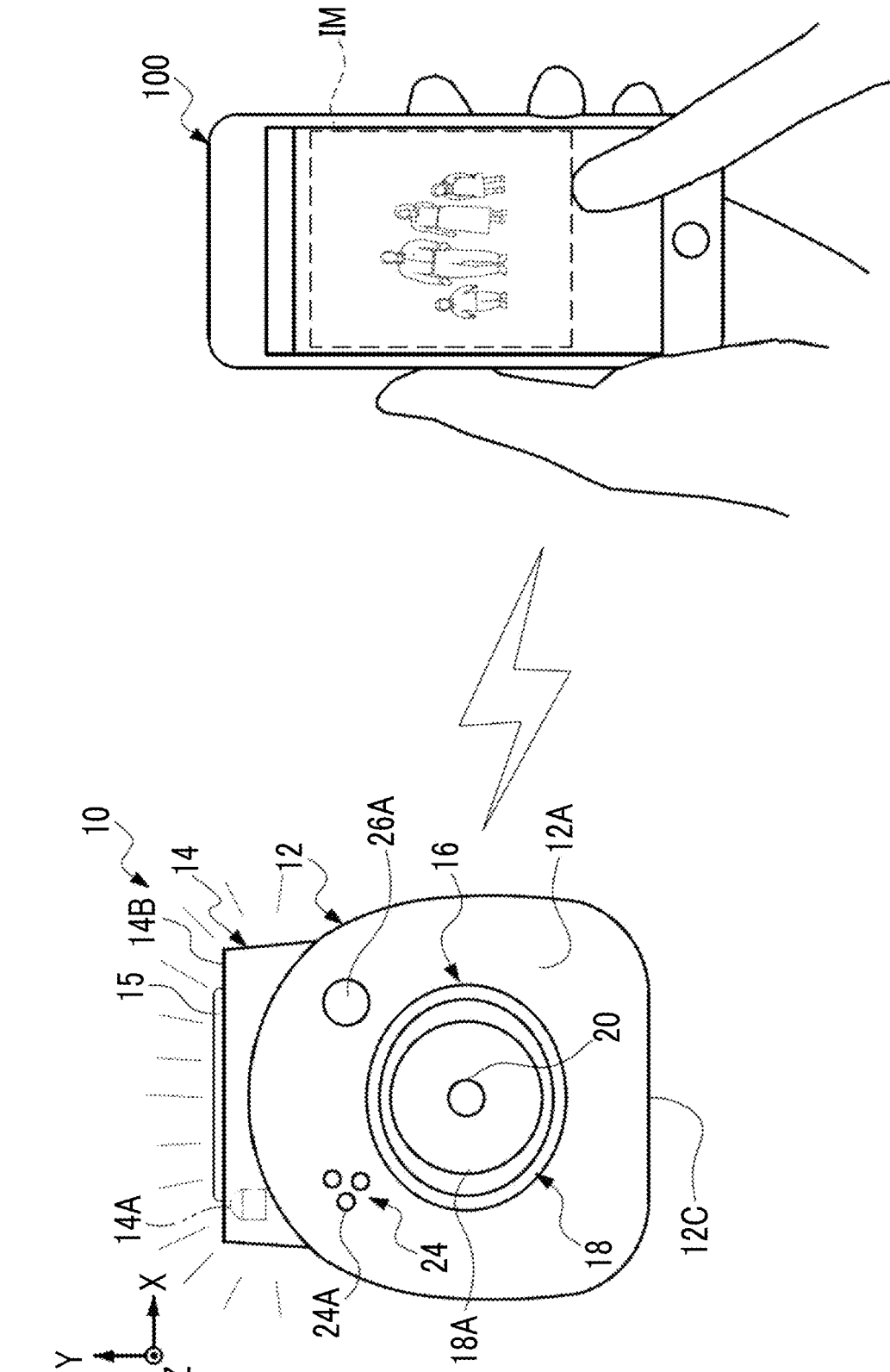
FIG. 1 is a conceptual view showing an example of the way in which a camera according to an embodiment is used.

For example, as shown in FIG. 1, the camera 10 is an imaging apparatus that images a subject. In the case of the camera 10, for example, the subject is imaged in a case where a user presses a shutter button. The camera 10 can obtain a still image or a moving image including a subject image. The camera 10 has a small size (for example, the camera 10 has such a size that the camera 10 fits in an adult's palm) in comparison with a general digital or instant camera and can be easily handled by a user. The camera 10 is an example of a "camera" according to the embodiment of the present disclosed technology.

The camera 10 includes the housing 12. The housing 12 accommodates, in addition to the imaging element 30 (refer to FIG. 8), electronic components and the like for realization of an imaging function of the camera 10. Although details will be described later, the housing 12 is designed to have a rounded shape as a whole. That is, an outer peripheral surface of the housing 12 is mainly composed of a curved surface and the outer shape of the housing 12 is an approximately egg-like shape. The housing 12 is provided with an opening portion 16. The opening portion 16 causes subject light to be incident on an imaging lens 20. In an example shown in FIG. 1, a lens unit 18 is exposed to the outside through the opening portion 16. The lens unit 18 is configured to include the imaging lens 20 and a holding frame 18A that holds the imaging lens 20. Here, the expression "the lens unit 18 is exposed" also means a state where the lens unit 18 is directly exposed and a state where the lens unit 18 is covered with a cover member to such a degree that there is no influence on the imaging of a subject.

In addition, in a case where a side of the housing 12 at which the opening portion 16 is provided is referred to as a front surface 12A of the housing 12, the front surface 12A is provided with a speaker unit 24 and a flash unit 26. Regarding the speaker unit 24, various operation sounds (for example, an electronic sound resembling the sound of a shutter being released) are output from a sound source (not shown) provided inside the housing 12. In the example shown in FIG. 1, sound is output through three through-holes 24A. In addition, regarding the flash unit 26, light is emitted to a subject from a light source (not shown) provided inside the housing 12. In the example shown in FIG. 1, the light source is covered with a cover member 26A provided in the housing 12.

An upper portion of the housing 12 is provided with an indicator 14. The exterior of the indicator 14 is formed of a translucent material, and light from a light source 14A provided in the indicator 14 is emitted to the outside. The indicator 14 performs notification about information on the camera 10 by means of light emission. For example, the indicator 14 can emit light in accordance with the state of operation of the camera 10. The indicator 14 is an example of a "light emitting unit" according to the embodiment of the present disclosed technology.

For example, in a case where the camera 10 has a function of communicating with the outside, the indicator 14 emits light having a preset color at preset light emission intervals while the camera 10 is communicating with the outside. In the example shown in FIG. 1, an example in which a smartphone 100 and the camera 10 communicated with each other in a wireless manner is shown. In this case, the indicator 14 performs a light emission operation indicating that the camera 10 is communicating with the outside.

As a result of wireless communication, data indicating a captured image IM obtained by the camera 10 is transmitted to the smartphone 100 and a user can check the captured image IM by using the smartphone 100.

Note that, the description has been made herein by using an example in which data indicating the captured image IM is transmitted to the smartphone 100 as an example of communication between the camera 10 and the outside. However, this is merely an example and the data indicating the captured image IM may be transmitted to an external printing apparatus. In addition, for example, a software (for example, a control program for the camera 10) may be downloaded to the camera 10.

In addition, here, a state where the camera 10 communicates with the outside has been described as an example of information on the camera 10 about which the indicator 14 performs notification. However, this is merely an example. For example, the indicator 14 may perform notification indicating that the camera 10 is out of order, that software is being updated in the camera 10, or the like as notification about the state of operation of the camera 10.

In addition, in the example shown in FIG. 1, the indicator 14 is a portion that protrudes upward from the housing 12. The indicator 14 has a trapezoidal shape as seen in a front view of the housing 12.

In addition, a through-hole may be formed in the exterior of the indicator 14 at a position corresponding to the light source. Accordingly, light emitted from the light source is likely to be emitted to the outside through the through-hole. As a result, light emitted from the indicator 14 can be easily visually recognized from the outside.

In addition, an upper surface 14B of the indicator 14 is provided with a power switch 15. The power switch 15 is provided on the upper surface 14B of the indicator 14 along a right-left direction (an X direction shown in FIG. 1). The camera 10 can be turned on by pressing the power switch 15 several times (for example, three times). In addition, the camera 10 can be turned off by pressing the power switch 15 for a few seconds (for example, 3 seconds).

In addition, a lower surface 12C is formed at a lower portion of the housing 12. At least a portion of a region including the center of the lower surface 12C is composed of a flat surface. Accordingly, the camera 10 can be placed on a desk or the like. Here, the expression "flat surface" also means a completely flat surface and a surface that is flat to such a degree that the housing 12 can be placed thereon.

Figure 2:
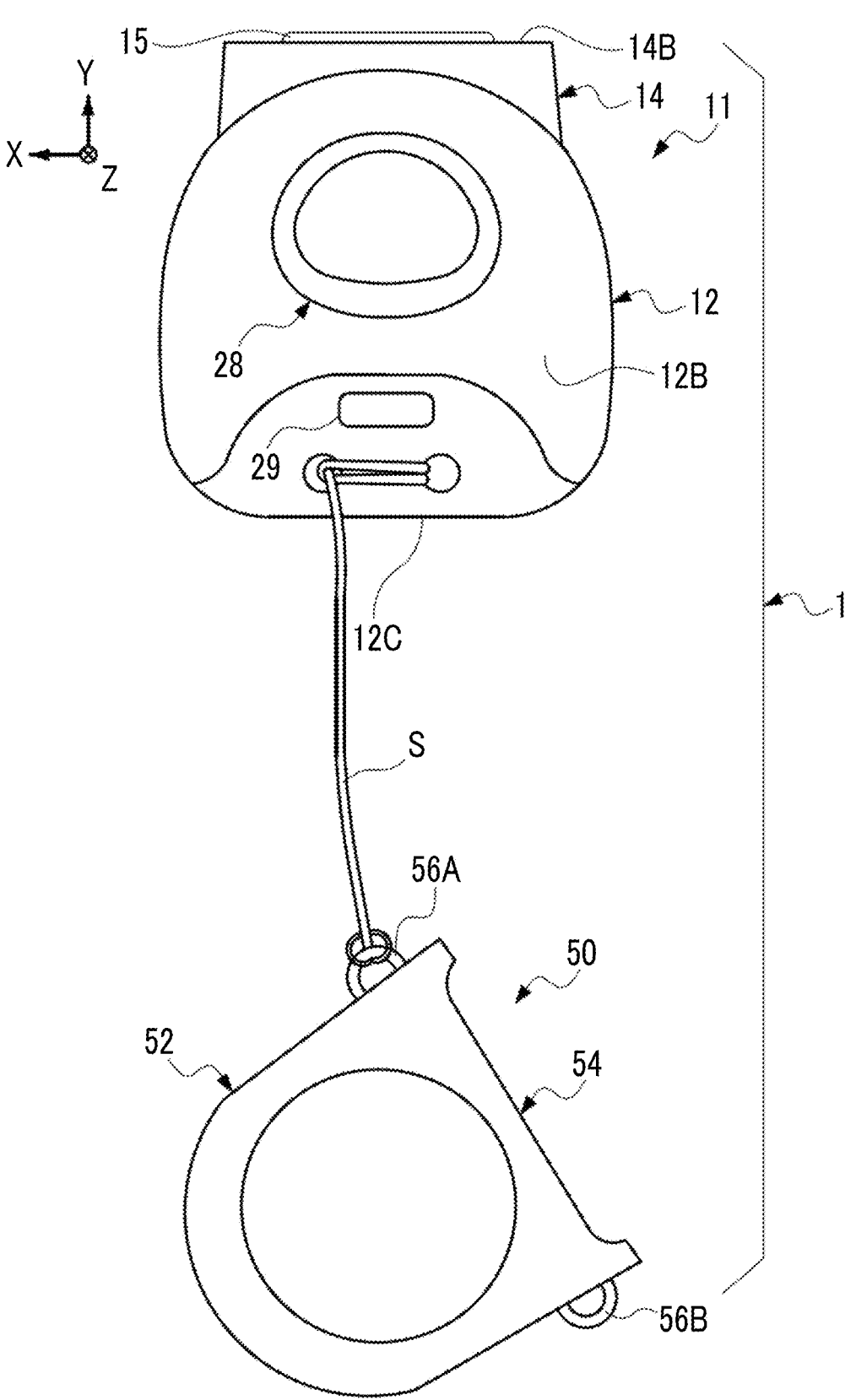
FIG. 2 is a rear view showing an example of a configuration of a camera system according to the embodiment.

In addition, for example, as shown in FIG. 2, in a case where a side of the housing 12 that is opposite to the front surface 12A is referred to as a rear surface 12B (that is, in a case where a side facing the front surface 12A in the optical axis direction of the imaging lens 20 is referred to as the rear surface 12B), the rear surface 12B is provided with a shutter button 28. The shutter button 28 can be pressed in a direction toward the front surface 12A side. As described above, a subject is imaged by the camera 10 in a case where the shutter button 28 is pressed by a user.

In addition, in the case of a general digital camera, a display unit (for example, a liquid crystal display or the like) used to check a subject image is installed at a rear surface in many cases. Meanwhile, in the present embodiment, the rear surface 12B of the camera 10 is not provided with a display unit used to check a subject image. Note that it is a matter of course that the rear surface 12B of the camera 10 may be provided with a display unit (for example, a display unit indicating the residual charge of a battery) for a purpose other than a purpose of checking a subject image.

In addition, the rear surface 12B of the housing 12 is provided with a reception portion 29. The reception portion 29 is a terminal that is electrically connected to an external device, and the reception portion 29 is, for example, a universal serial bus (USB) terminal. Through the reception portion 29, a battery of the camera 10 is charged or wired communication between the camera 10 and an external device is performed.

Here, as described above, the camera 10 is a camera that is small in comparison with a general digital camera or the like. Therefore, for furthermore improvement in handiness of the camera 10, as shown in FIG. 2, a camera system 1 according to the present embodiment includes the camera 10 and an accessory 50, for example. The camera system 1 is an example of a "camera system" according to the embodiment of the present disclosed technology.

The accessory 50 is a component attached to the camera 10 and is a component that can be mounted to the camera 10. In an example shown in FIG. 2, the accessory 50 is connected to the camera 10 via a string S. Specifically, one end of the string S is attached to the rear surface 12B of the camera 10, and the other end of the string S is attached to the accessory 50. The accessory 50 is an example of an "attachment" according to the embodiment of the present disclosed technology.

The accessory 50 includes a frame portion 52, a mounting portion 54, and a pair of string attachment portions 56A and 56B. The frame portion 52 is a frame-shaped portion and functions as a frame that defines a visual field in a case in which the accessory 50 functions as a finder. The mounting portion 54 is a portion via which the accessory 50 is mounted to the housing 12 of the camera 10. In the example shown in FIG. 2, an example in which the frame portion 52 is an annular frame is shown.

Each of the pair of string attachment portions 56A and 56B is a portion via which the string S is attached to the accessory 50. In the example shown in FIG. 2, the other end of the string S is attached to the string attachment portion 56A provided on a side surface of the accessory 50.

The accessory 50 functions as a grip portion used to carry the camera 10. That is, it is easy to carry the camera 10 by putting a finger in the frame portion 52 of the accessory 50 or hooking the frame of the frame portion 52 on a hook.

Figure 3:
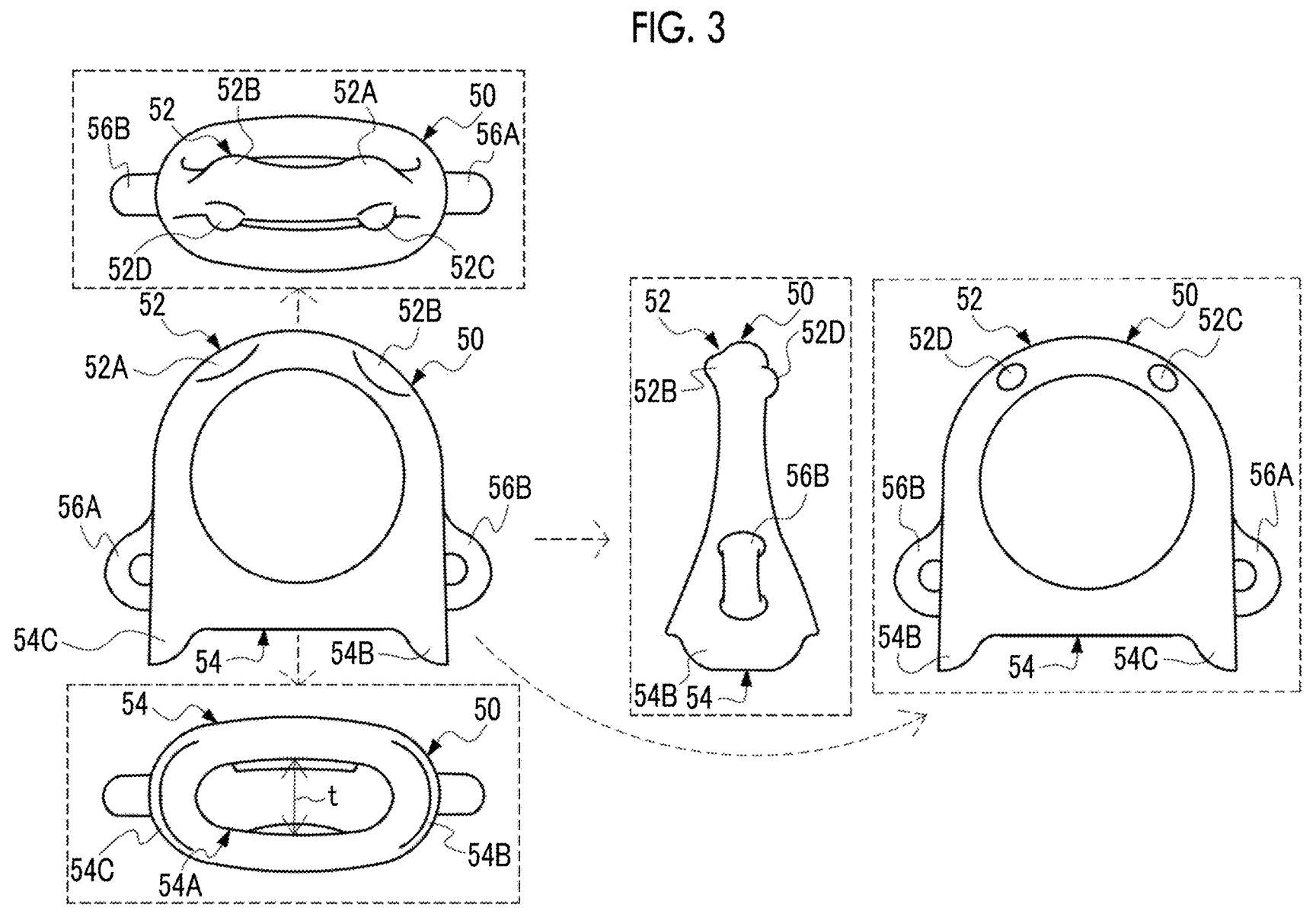

For example, as shown in FIG. 3, the frame portion 52 includes a first protrusion 52A and a second protrusion 52B provided on an upper surface side. Although the details will be described later, in a case where the accessory 50 functions as a stand for the camera 10, the first protrusion 52A and the second protrusion 52B abut the lower surface 12C of the camera 10. The first protrusion 52A and the second protrusion 52B are examples of a "plurality of supporting protrusions" according to the embodiment of the present disclosed technology.

In addition, the frame portion 52 includes a first leg portion 52C and a second leg portion 52D provided on a lower surface side. The first leg portion 52C and the second leg portion 52D abut an installation surface for the accessory 50 in a case where the accessory 50 functions as a stand.

The mounting portion 54 includes a through-hole 54A, a first mounting guide portion 54B, and a second mounting guide portion 54C. The through-hole 54A penetrates the frame portion 52 and the mounting portion 54. That is, in a case where the accessory 50 is viewed from the mounting portion 54 side, the inside of the frame portion 52 can be visually recognized. The mounting portion 54 is an example of a "mounting portion" according to the embodiment of the present disclosed technology, the frame portion 52 is an example of a "frame" according to the embodiment of the present disclosed technology, and the through-hole 54A is an example of a "through-hole" according to the embodiment of the present disclosed technology.

The first mounting guide portion 54B and the second mounting guide portion 54C are wall-shaped portions that protrude from an end portion of the mounting portion 54. The first mounting guide portion 54B and the second mounting guide portion 54C guide the mounting of the accessory 50 in a case where the accessory 50 is mounted to the indicator 14. Furthermore, the first mounting guide portion 54B and the second mounting guide portion 54C hold side surfaces of the indicator 14 in a state where the accessory 50 has been mounted to the indicator 14.

In an example shown in FIG. 3, a pair of the first mounting guide portion 54B and the second mounting guide portion 54C is provided at the end portion of the mounting portion 54. In addition, each of the first mounting guide portion 54B and the second mounting guide portion 54C is formed in an arc-like wall shape. The shapes of inner wall surfaces of the first mounting guide portion 54B and the second mounting guide portion 54C correspond to the shapes of side surfaces of the indicator 14.

Figure 4:
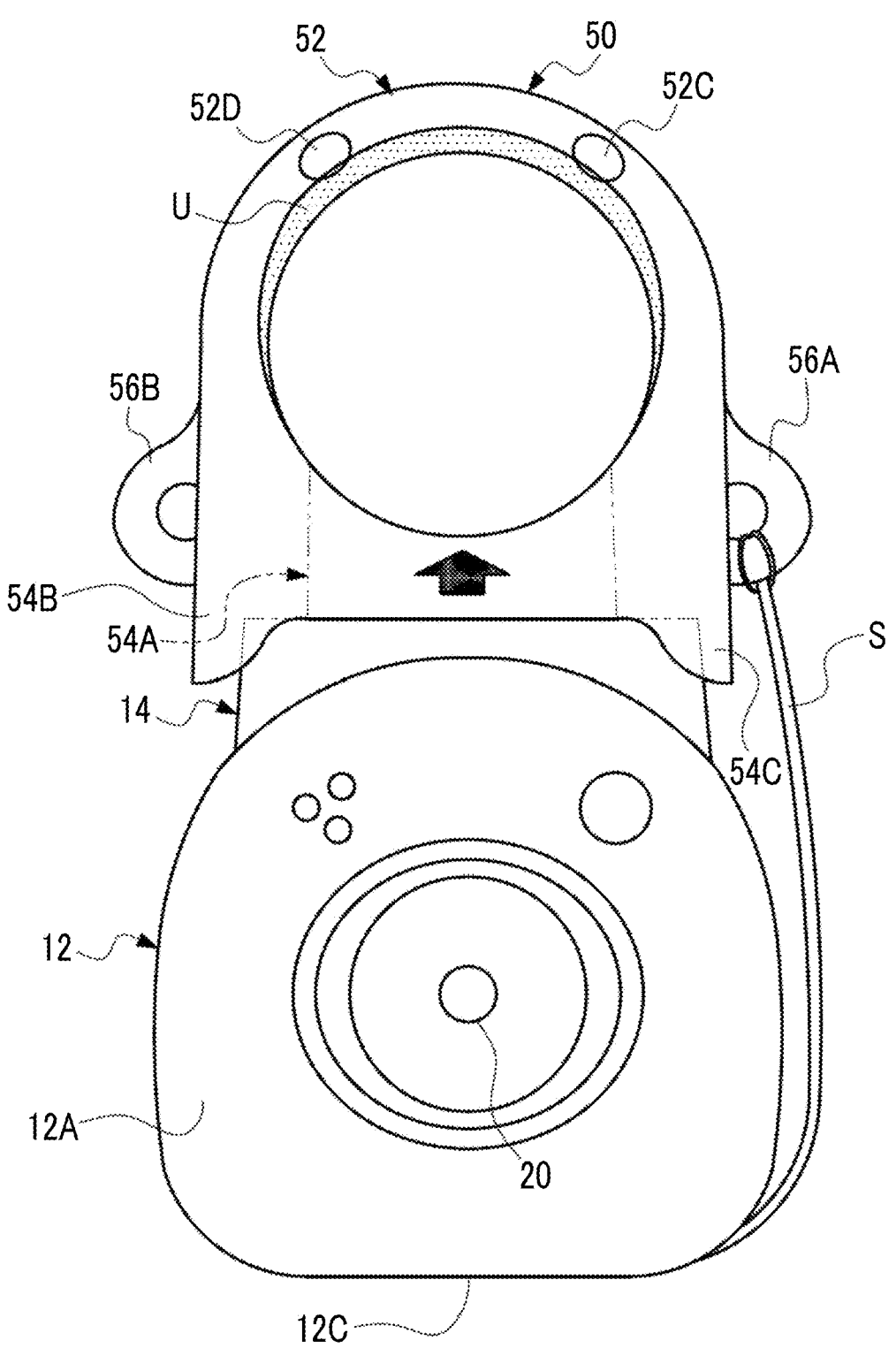
FIG. 4 is a front view showing an example of the configuration of the camera system according to the embodiment.

For example, as shown in FIG. 4, the accessory 50 is mounted to the camera 10. The accessory 50 is mounted to the indicator 14 of the camera 10 via the mounting portion 54. Specifically, the accessory 50 is attached to the indicator 14 from above the indicator 14. In this case, the first mounting guide portion 54B and the second mounting guide portion 54C of the mounting portion 54 hold the side surfaces of the indicator 14. Accordingly, the accessory 50 is mounted to the indicator 14.

In a case where the indicator 14 emits light in such a state, light that is emitted upward and that is a part of the light emitted from the indicator 14 passes through the through-hole 54A of the mounting portion 54. Then, a part of the light passing through the through-hole 54A illuminates the inside of the frame portion 52 of the accessory 50. For example, a region U inside the frame portion 52 is illuminated by the light emitted from the indicator 14. As described above, the inside of the frame portion 52 of the accessory 50 can be irradiated with the light emitted from the indicator 14.

Figure 5:
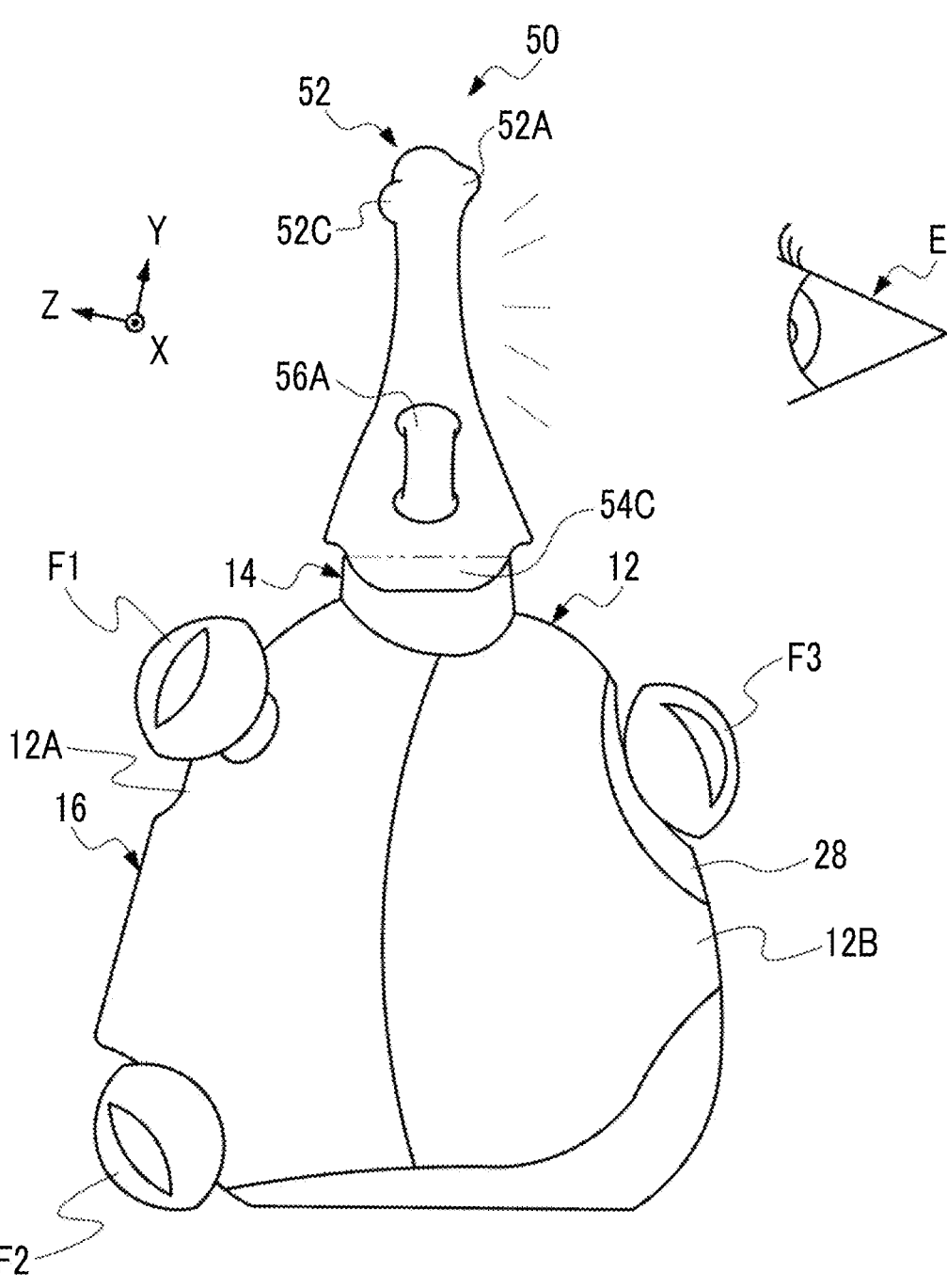
FIG. 5 is a side view showing an example of the configuration of the camera system according to the embodiment.

For example, as shown in FIG. 5, in a case where the inside of the frame portion 52 of the accessory 50 is irradiated with the light emitted from the indicator 14, the light is reflected inside the frame portion 52. A part of the reflected light travels in a direction toward an eye E of a user. Accordingly, the user can visually recognize the light emitted from the indicator 14.

Next, an example of the way in which the camera 10 according to the present embodiment is used will be described.

Figure 6:
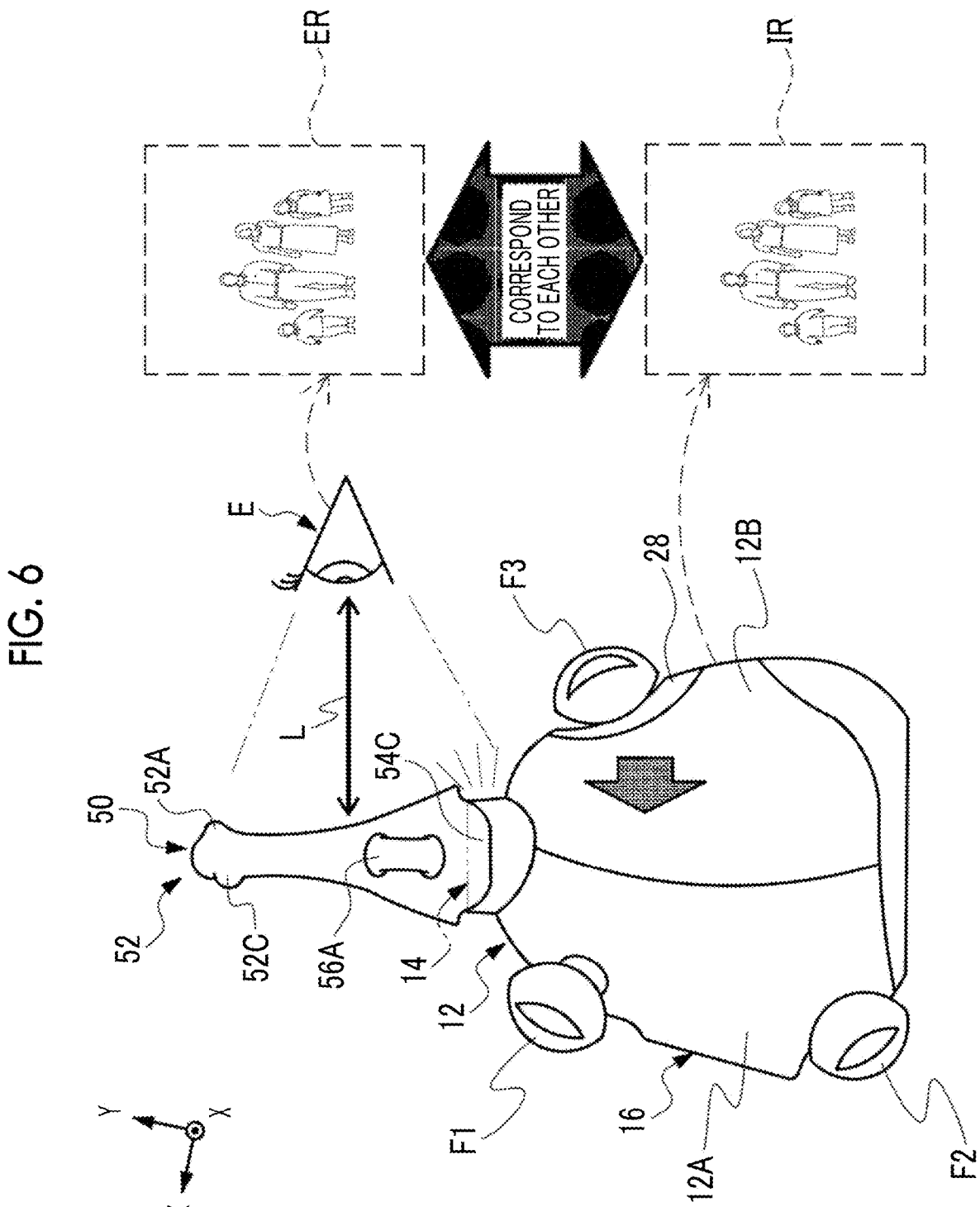
FIG. 6 is a side view showing an example of the way in which the camera system according to the embodiment is used.

For example, as shown in FIG. 6, the user grips the camera 10 by pinching the housing 12 with fingers from ahead and behind. Specifically, an index finger F1 and a middle finger F2 are caused to abut the rear surface 12B from the front surface 12A side of the housing 12, and a thumb F3 is caused to abut the front surface 12A from the rear surface 12B side. At the front surface 12A of the housing 12, the index finger F1 and the middle finger F2 sandwich the opening portion 16. Particularly, the middle finger F2 is caused to abut the front surface 12A such that the middle finger F2 supports the opening portion 16 from below. Meanwhile, at the rear surface 12B, the user causes the thumb F3 to abut the shutter button 28.

In addition, as another method of gripping the camera 10, there is also a method in which the middle finger F2 is caused to abut a right side of the opening portion 16 and the index finger F1 is caused to abut a left side of the opening portion 16. In addition, the user may grip the camera 10 by pinching the housing 12 with fingers from above and below. Furthermore, it is a matter of course that the camera 10 may be held or operated by means of both hands of the user.

The accessory 50 has a function as a finder in a state of being mounted to the camera 10. For example, the frame portion 52 of the accessory 50 is a guide used to check an imaging range in a case where the user looks through the finder. Here, since the frame portion 52 of the accessory 50 is not provided with an optical element such as a lens, the frame portion 52 functions as a simple finder (a so-called sportsfinder).

The expression "the frame portion 52 functions as a simple finder" means that, in a case where the frame portion 52 is used as a finder as shown in FIG. 6, the frame portion 52 has a function with which the user checks an imaging range by visually recognizing a subject through a frame that is a guide used to check an imaging range to obtain the orientation of the camera 10 with respect to the subject and how widely an area around the subject is reflected.

In addition, the accessory 50 may function as not only a simple finder but also a finder including an optical system, such as a real image finder or a virtual image finder. In this case, the frame portion 52 of the accessory 50 is provided with various optical elements.

In addition, in a case where the accessory 50 functions as a finder, the indicator 14 is disposed at a position at which the indicator 14 can be visually recognized by the user in a state where the user looks through the finder. The position at which the indicator 14 can be visually recognized by the user is a position at which a distance L between the eye E of the user and the accessory 50 serving as the finder is appropriate. A visual field ER in the frame portion 52 related to a case where the finder is looked through at such a position corresponds to an imaging range IR of the camera 10. That is, the visual field ER and the imaging range IR coincide with each other. Note that cases where the visual field ER and the imaging range IR coincide with each other include a case where the visual field ER and the imaging range IR completely coincide with each other and there may be an error to an extent allowed in a technical field to which the present disclosed technology belongs. In this way, in a case where the user uses the finder, an exposed portion of the indicator 14 is visually recognized by the user. Therefore, the indicator 14 serves as an indicator indicating that a visual field regarding a subject seen through the finder and an imaging range correspond to each other.

After checking an imaging range by looking through the finder, the user presses the shutter button 28 (refer to an arrow in FIG. 6). As a result, imaging is performed by means of the camera 10.

Figure 7:
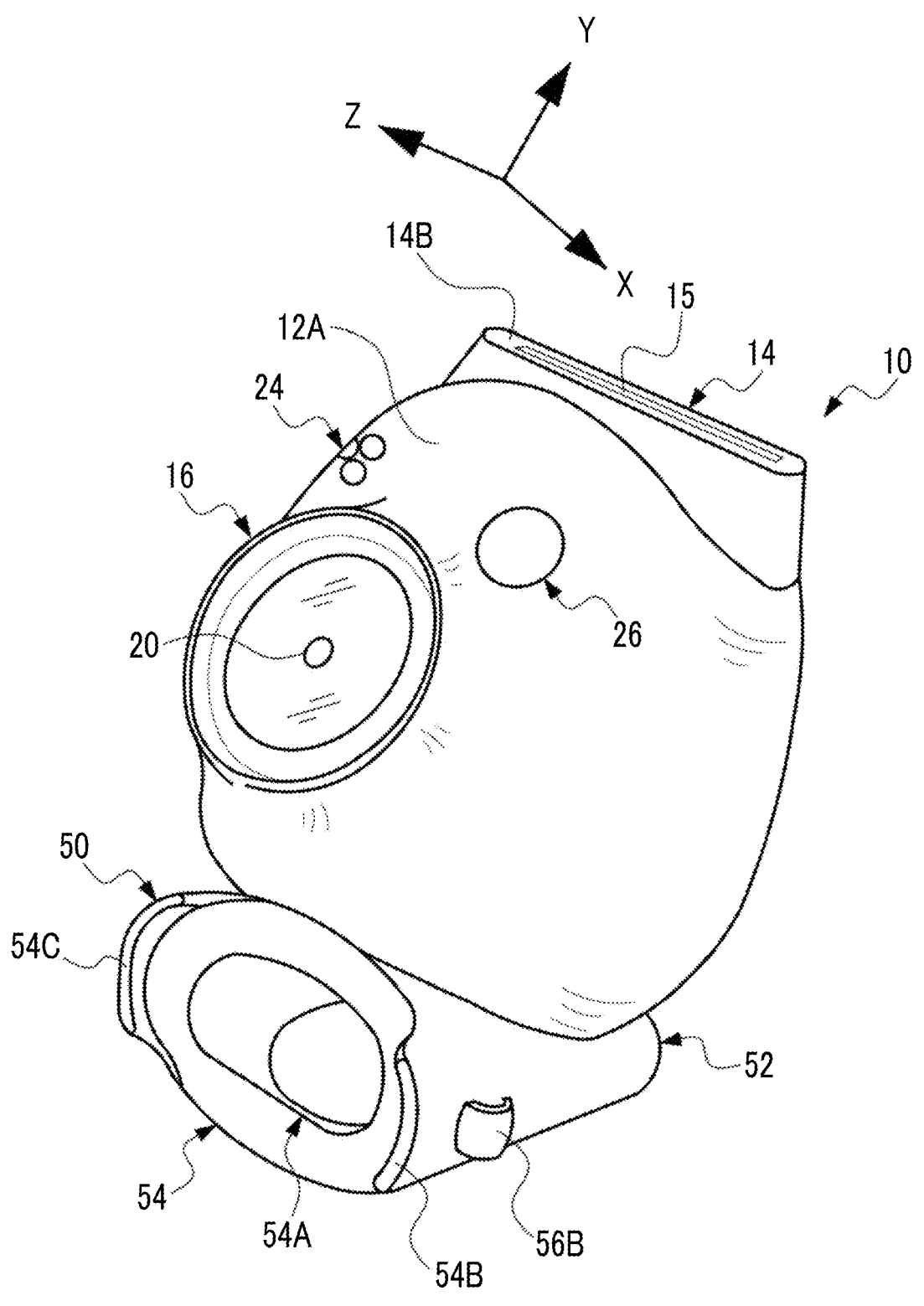
FIG. 7 is an external perspective view showing an example of the configuration of the camera system according to the embodiment.
Figure 8:
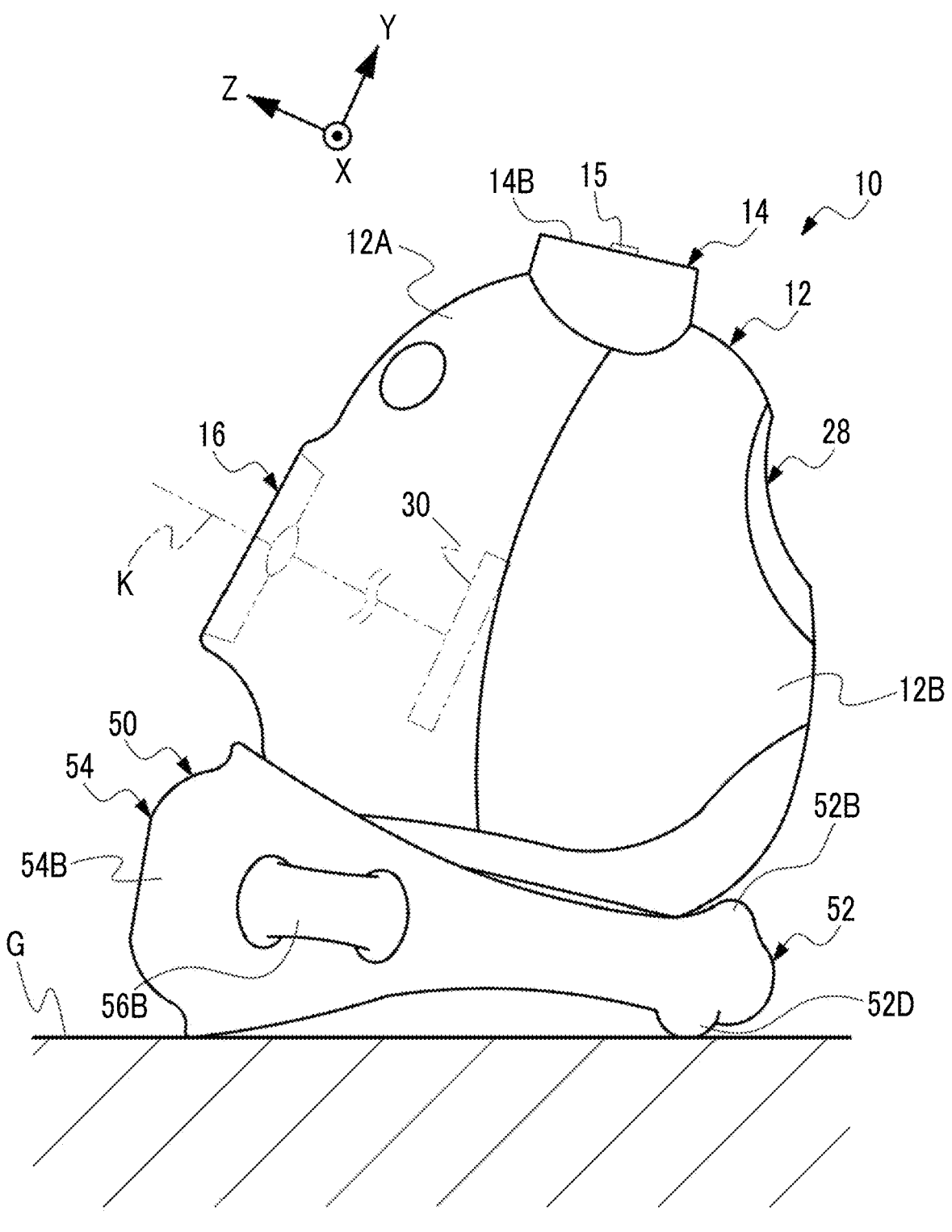
FIG. 8 is a side view showing an example of the configuration of the camera system according to the embodiment.

In addition, for example, as shown in FIGS. 7 and 8, the accessory 50 also functions as a stand on which the camera 10 can be placed. In a state where the accessory 50 is installed on an installation surface G, the camera 10 is placed on an upper side of the frame portion 52 of the accessory 50. For example, the mounting portion 54 side of the accessory 50 is positioned on the front surface 12A side of the camera 10, and the frame portion 52 of the accessory 50 is positioned on the rear surface 12B side of the camera 10. In addition, the annular frame of the frame portion 52 has a size enough to hold a peripheral edge of the lower surface 12C of the housing 12 of the camera 10. Furthermore, the first protrusion 52A and the second protrusion 52B provided at the frame portion 52 can abut a lower portion of the camera 10. In other words, the first protrusion 52A and the second protrusion 52B are support points at which the camera is supported. Accordingly, the camera 10 falling off the stand or being supported in an unstable state is suppressed.

In addition, in a state where the camera 10 is placed on the accessory 50 functioning as a stand, an optical axis K is upwardly inclined with respect to a horizontal direction. That is, in a case the camera 10 is placed on the stand, an elevation angle is applied. Here, the height of the frame portion 52 from the installation surface G differs along a circumferential direction of the frame portion 52. Specifically, the height of the frame portion 52 is larger on the mounting portion 54 side. That is, as seen in a side view of the accessory 50, the height of the mounting portion 54 is larger than the height of the frame portion 52. Therefore, in a case where the camera 10 is placed on the accessory 50 that functions as a stand, the optical axis K of the camera 10 is inclined in such a direction that the optical axis K is made farther from the installation surface G on a subject side. In this manner, the camera 10 can be placed on the accessory 50, which functions as a stand, in a posture in which the optical axis K of the camera 10 is inclined with respect to the horizontal direction.

Figure 9:
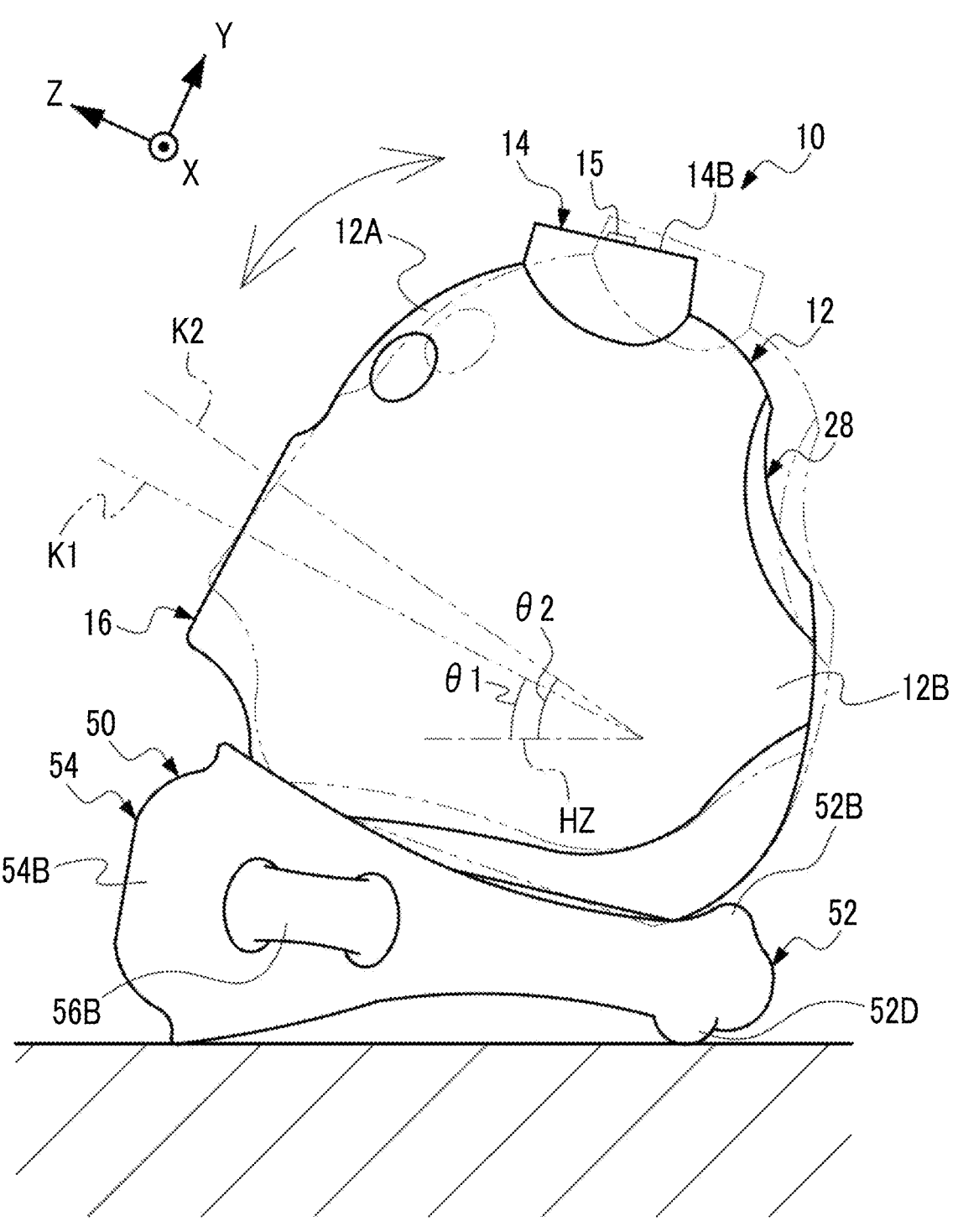
FIG. 9 is a side view showing an example of the way in which the camera system according to the embodiment is used.

For example, as shown in FIG. 9, the accessory 50 that functions as a stand has such a shape that the inclination angle of the optical axis K with respect to a horizontal direction can be adjusted. That is, the user rotates the camera 10 with respect to the accessory 50 in such a direction that an elevation angle is changed so that the inclination angle is adjusted. Specifically, as seen in a side view of the accessory 50, there is a continuous inclined surface from the mounting portion 54 to the frame portion 52. In addition, as described above, the height of the mounting portion 54 is larger than the height of the frame portion 52. Therefore, it is possible to adjust the optical axis K of the camera 10 with respect to the horizontal direction by changing the angle of inclination of the camera 10 along the inclined surface.

In an example shown in FIG. 9, an example in which camera 10 is tilted to face an upper side by the user is shown. That is, the camera 10 is moved in such a direction that an optical axis K1 of the camera 10 is adjusted to an optical axis K2. An inclination angle θ1 with respect to a line HZ along the horizontal direction before adjustment is changed to an inclination angle θ2 after the adjustment. In this manner, the optical axis K of the camera 10 can be adjusted with respect to the horizontal direction.

As described above, the camera system 1 according to the present embodiment includes the camera 10 including the indicator 14 and the accessory 50 that can be mounted to the camera 10. The accessory 50 functions, in a state of being mounted to the camera 10, as a finder used to check an imaging range of the camera 10. In addition, the inside of a frame of the finder can be irradiated with light emitted from the indicator 14. Accordingly, since the inside of the frame of the finder can be illuminated by light from the indicator 14, the user can easily visually recognize light emission of the indicator 14 in comparison with the case of a known attachment in the related art that has a function as a finder.

In addition, for example, since the accessory 50 attached to the camera 10 functions as a finder, size reduction of the camera 10 is realized in comparison with a configuration in which a camera and a finder are always integrated with each other.

In the case of an auxiliary finder known in the related art, a light emitting unit is provided outside a frame of a finder. Therefore, in a bright environment such as an environment under the blazing sun, it is difficult to visually recognize light emission even in a case where the amount of light emission is increased. In addition, there is also a disadvantage in that it is difficult to check light emission in the case of usage in which an eye is brought close to an eyepiece portion or in the case of a user who wears glasses. Therefore, since the configuration as described above is adopted, the inside of a frame of an auxiliary finder is irradiated with emitted light and thus it is easy for the user to visually recognize light emission of a light emitting unit.

In addition, in the camera system 1 according to the present embodiment, the accessory 50 is provided with the through-hole 54A formed in the mounting portion 54 with respect to the camera 10. In addition, light from the indicator 14 passes through the through-hole 54A and thus the inside of the frame portion 52 can be irradiated with the light from the indicator 14. Accordingly, it is easy for the user to visually recognize light emission of the indicator 14 with a simple configuration in comparison with a case where the accessory 50 is provided with a light guide member.

In addition, in the camera system 1 according to the present embodiment, the frame portion 52 of the accessory 50 is a guide used to check an imaging range and the accessory 50 functions as a simple finder that does not include a lens. Accordingly, since the visual field of the finder is defined by a frame shape, a function as a finder is realized with a simple configuration in comparison with a case where the finder is provided with an optical element such as a lens.

In addition, in a case where the frame portion 52 is provided with an optical element, light from the indicator 14 is biased or diffracted by the optical element and thus it may be difficult for the user to visually recognize light emission of the indicator 14. In the present configuration, since the accessory 50 functions as a simple finder that does not include a lens, the user can easily visually recognize light from the indicator 14.

In addition, in the camera system 1 according to the present embodiment, in addition to the function as a finder, the accessory 50 also has a function as a grip portion used to carry the camera 10 or a function as a stand on which the camera 10 can be placed. Accordingly, even in a case where the accessory 50 is not mounted, another function of the accessory 50 can be used. Therefore, the use convenience of the accessory 50 is improved in comparison with the case of the accessory 50 having only one function.

In addition, in the camera system 1 according to the present embodiment, the accessory 50 also functions as a stand on which the camera 10 can be placed. Accordingly, the camera 10 can be stably installed in comparison with a case where the camera 10 is directly installed on the installation surface G without using a stand. The present configuration is effective, for example, in a case where the camera 10 is used as a fixed-point camera.

In addition, in the camera system 1 according to the present embodiment, the camera 10 can be placed on the accessory 50, which functions as a stand, in a posture in which the optical axis K of the camera 10 is inclined with respect to the horizontal direction. Accordingly, it is possible to change an imaging range of the camera 10 by making the optical axis K of the camera 10 inclined with respect to the horizontal direction and furthermore, it is possible to stably maintain the camera 10 in an inclined posture. For example, by placing the camera 10 in a state where the optical axis K of the camera 10 is inclined in a direction away from the installation surface G, it is possible to place, within an imaging range, a large number of subjects (for example, persons) that the user wants to place within the imaging range.

In addition, in the camera system 1 according to the present embodiment, the accessory 50 that functions as a stand has such a shape that an inclination angle θ of the optical axis K with respect to the horizontal direction can be adjusted. Accordingly, since the inclination angle of the camera 10 can be adjusted, imaging at the inclination angle desired by the user can be performed.

In addition, in the camera system 1 according to the present embodiment, regarding the accessory 50 that functions as a stand, the height of the frame portion 52 from the installation surface G differs in the circumferential direction of the frame portion 52, so that the inclination angle can be adjusted. Accordingly, since the inclination angle of the camera 10 can be adjusted, imaging at the inclination angle desired by the user can be performed.

In addition, in the camera system 1 according to the present embodiment, the frame portion 52 of the accessory 50 is a guide used to check an imaging range and the accessory 50 includes the first protrusion 52A and the second protrusion 52B that support the camera 10 in a case where the accessory 50 is used as a stand. The first protrusion 52A and the second protrusion 52B are disposed at the frame portion 52. Accordingly, since the first protrusion 52A and the second protrusion 52B abut and support the lower portion of the camera 10, the camera 10 placed on the accessory 50 that functions as a stand is stably supported.

In addition, in the camera system 1 according to the present embodiment, the camera 10 has a communication function, and in a case where the camera 10 communicates with an external device, the indicator 14 performs, by means of light emission, notification indicating that the camera 10 is in communication. While the camera 10 is communicating with an external device, the camera 10 may not be suitable for imaging. The user can ascertain whether or not the camera 10 is in a state suitable for imaging by visually recognizing the inside of the frame portion 52 of the accessory 50 functioning as a finder.

In addition, in the camera system 1 according to the present embodiment, the indicator 14 is disposed at a position at which light emitted by the indicator 14 can be visually recognized by the user in a state where the user looks through a finder mounted to the camera 10. In a case where a finder is used, since the indicator 14 can be visually recognized by the user, imaging with an imaging range desired by the user is realized. That is, in a case where a finder is used, since the indicator 14 is an indicator indicating that a visual field observed through the finder and an imaging range correspond to each other, imaging with an imaging range desired by the user is realized.

First Modification Example

In the above-described embodiment, the description has been made by using an example in which the inside of the frame portion 52 is irradiated with light from the indicator 14 via the through-hole 54A. However, the present disclosed technology is not limited thereto. In a first modification example, a portion of the accessory 50 is formed of a light-transmitting material.

Figure 10:
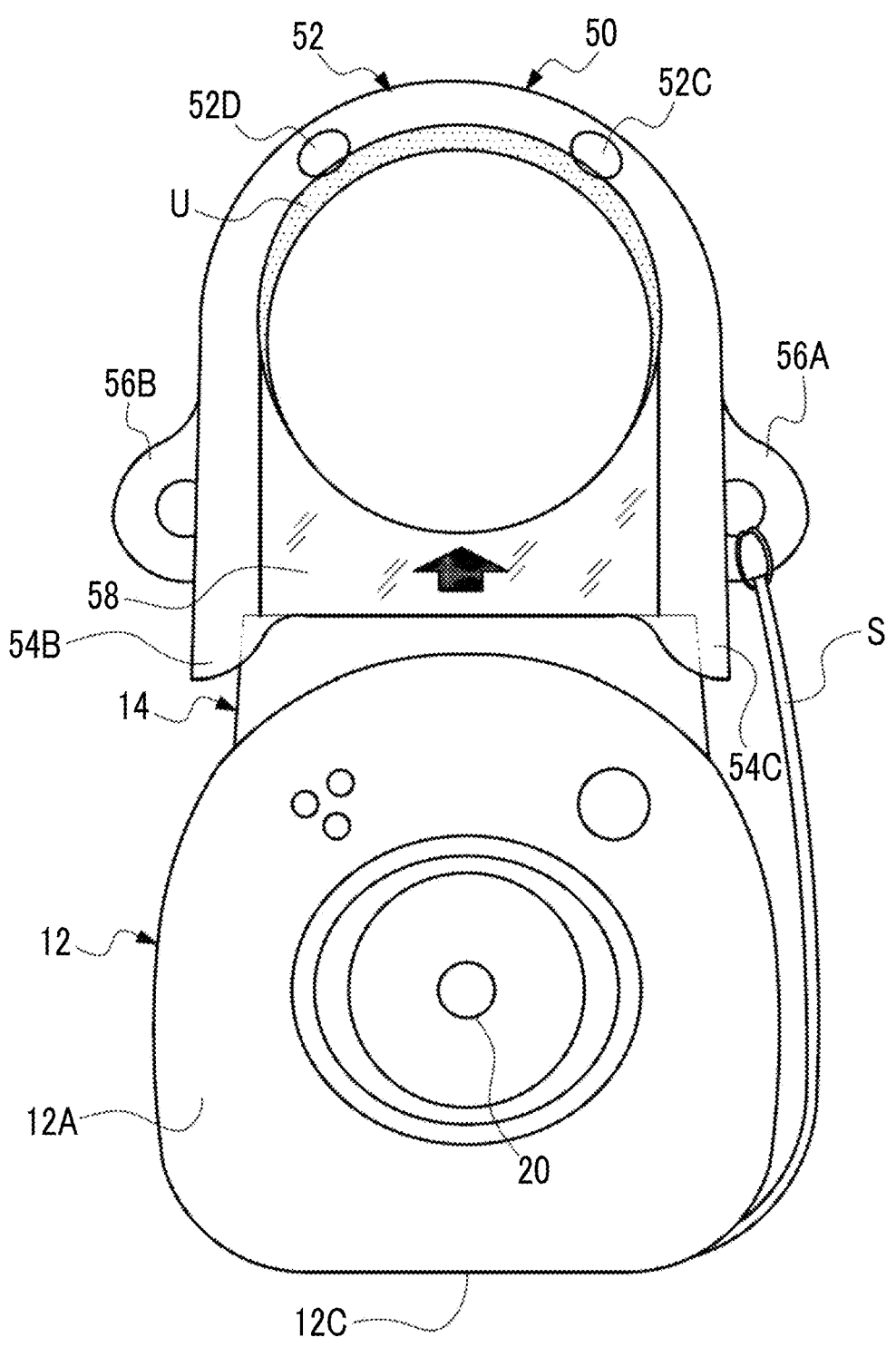
FIG. 10 is a front view showing an example of the configuration of the camera system according to the embodiment.

For example, as shown in FIG. 10, a light transmission portion 58 is formed at the mounting portion 54 of the accessory 50. The light transmission portion 58 transmits light emitted from the indicator 14. The light transmission portion 58 is formed of a light-transmitting material that is a material transparent with respect to visible light. The light-transmitting material is, for example, an acrylic resin.

In an example shown in FIG. 10, the light transmission portion 58 is formed between the mounting portion 54 and the frame portion 52. Light emitted from the indicator 14 is transmitted through the light transmission portion 58, and a part of the light illuminates the inside of the frame portion 52 of the accessory 50. For example, the region U inside the frame portion 52 is illuminated by the light emitted from the indicator 14. As described above, the inside of the frame portion 52 of the accessory 50 can be irradiated with the light emitted from the indicator 14.

As described above, in the first modification example, a portion of the accessory 50 is formed of a light-transmitting material, and the inside of the frame portion 52 can be irradiated with light from the indicator 14. Accordingly, since the inside of a frame of a finder can be illuminated by light from the indicator 14, the user can easily visually recognize light emission of the indicator 14.

In addition, in the first modification example, the light is scattered not only in the frame portion 52 but also in the light transmission portion 58 so that the accessory 50 itself also partially emits light. Therefore, it is easy for the user to visually recognize light emission of the indicator 14.

Note that in the first modification example, the description has been made by using an example in which a portion of the accessory 50 is formed of a light-transmitting material. However, the present disclosed technology is not limited thereto. For example, the entire accessory 50 may be formed of a light-transmitting material.

Second Modification Example

In the above-described embodiment, the description has been made by using an example in which the inside of the frame portion 52 is irradiated with light from the indicator 14 via the through-hole 54A. However, the present disclosed technology is not limited thereto. In a second modification example, the accessory 50 is provided with a light guide member 60.

Figure 11:
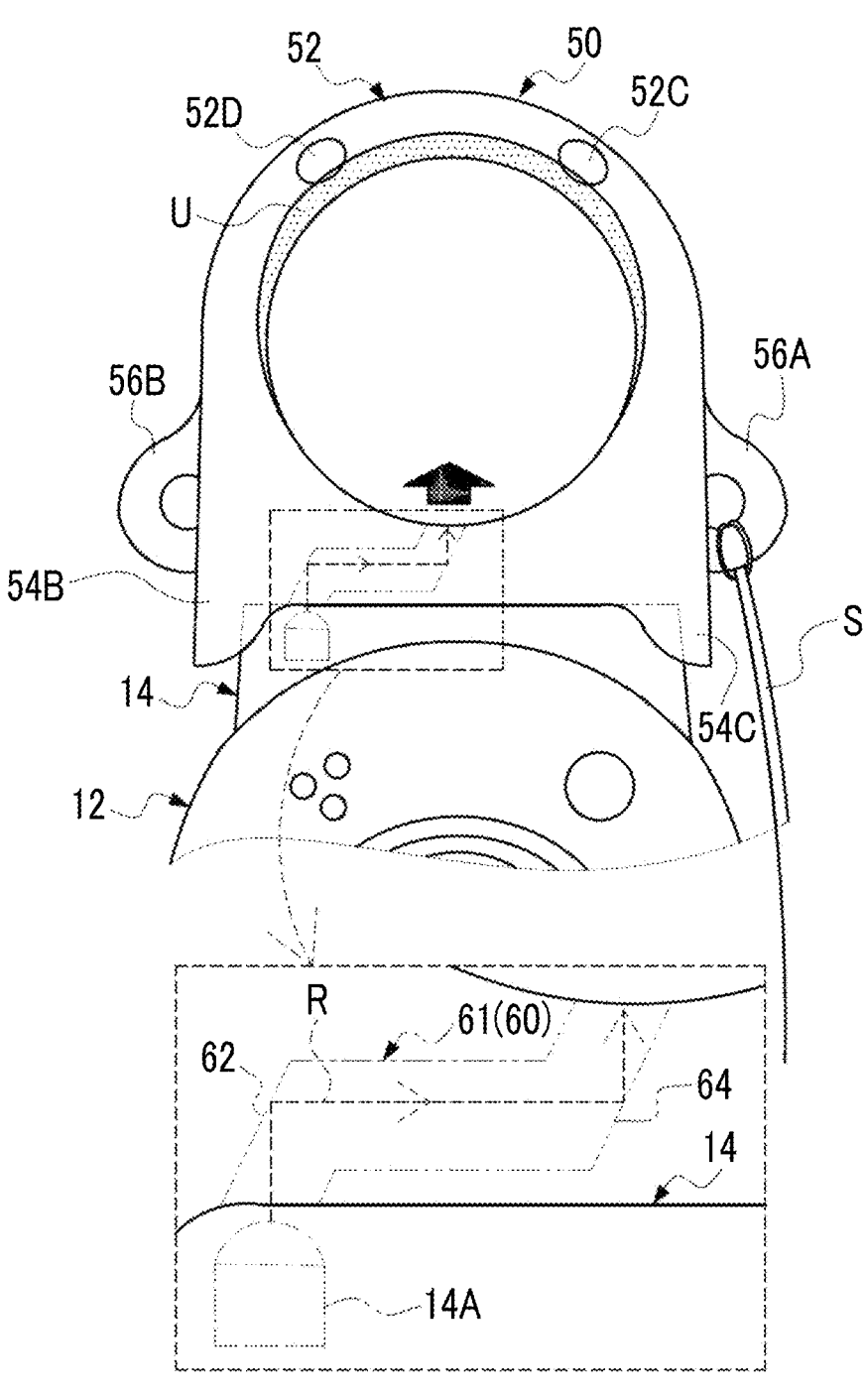
FIG. 11 is an enlarged view showing an example of the configuration of the camera system according to the embodiment.

For example, as shown in FIG. 11, the accessory 50 includes the light guide member 60 provided between the mounting portion 54 and the frame portion 52. The light guide member 60 is a member that guides light from the indicator 14 to the inside of the frame portion 52 by causing the light from the indicator 14 to propagate inside the light guide member 60. In an example shown in FIG. 11, a prism 61 is shown as the light guide member 60. The prism 61 is made of a resin, and light from the indicator 14 travels along an optical path R formed inside the prism 61. Specifically, light emitted from the light source 14A of the indicator 14 is reflected by a first reflecting surface 62 and is reflected again by a second reflecting surface 64. The light reflected by the second reflecting surface 64 is emitted toward the inside of the frame portion 52.

A part of light emitted from the indicator 14 is guided to the inside of the frame portion 52 of the accessory 50 through the light guide member 60. For example, the region U inside the frame portion 52 is illuminated by the light emitted from the indicator 14. As described above, the inside of the frame portion 52 of the accessory 50 can be irradiated with the light emitted from the indicator 14.

As described above, in the second modification example, the accessory 50 is provided with the light guide member 60. Through the light guide member 60, the inside of the frame portion 52 can be irradiated with light from the indicator 14. Accordingly, since the inside of a frame of a finder can be illuminated by light from the indicator 14, the user can easily visually recognize light emission of the indicator 14.

In addition, in the second modification example, since the inside of the frame portion 52 is illuminated with light from the indicator 14 through the light guide member 60, a large amount of light can be guided into the frame portion 52 and it is easy for the user to visually recognize light emission.

Figure 12:
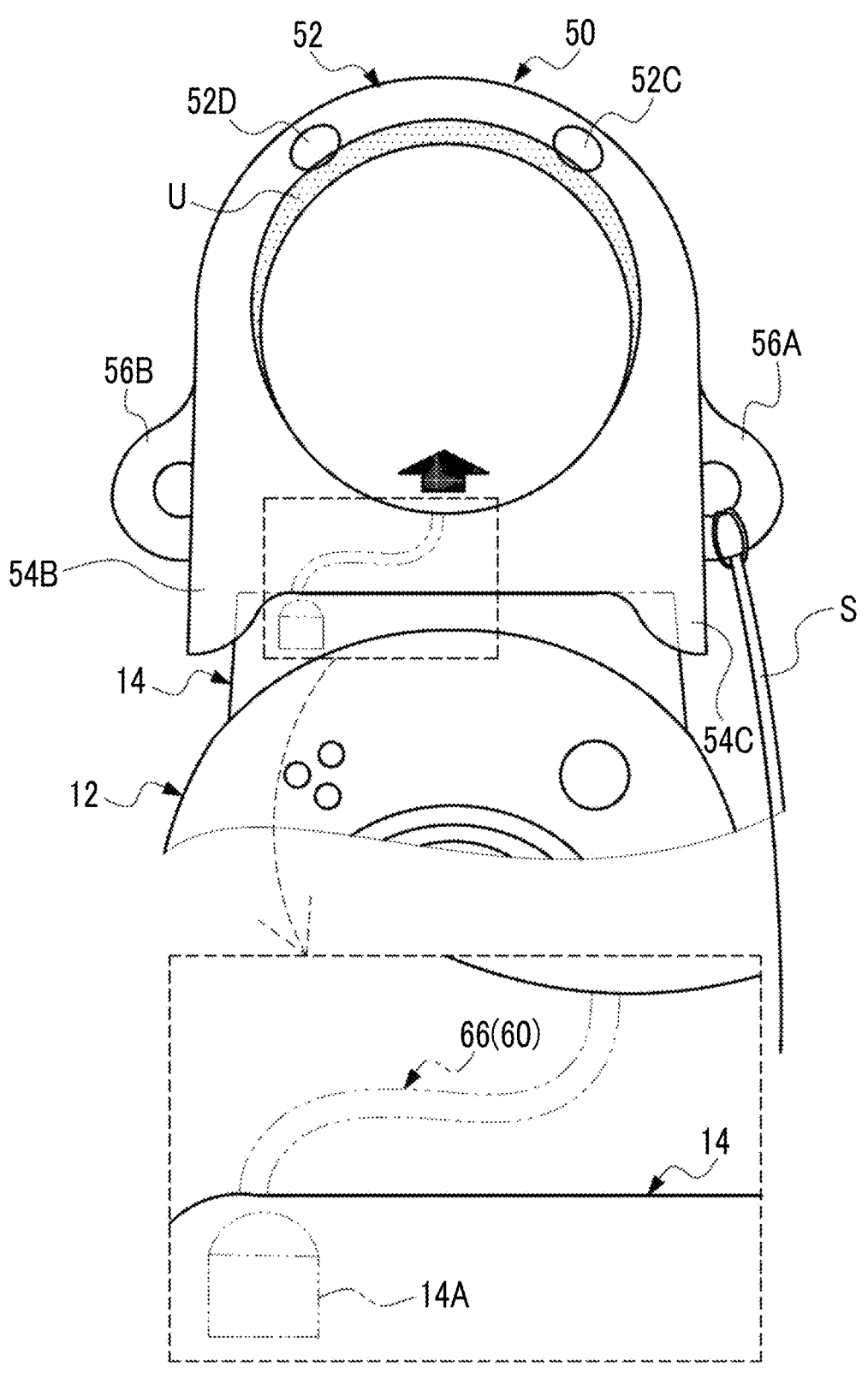
FIG. 12 is an enlarged view showing an example of the configuration of the camera system according to the embodiment.

Note that in the second modification example, the description has been made by using an example in which the prism 61 is used as the light guide member 60. However, the present disclosed technology is not limited thereto. For example, as shown in FIG. 12, a fiber 66 is used as the light guide member 60. One end portion of the fiber 66 is provided at a position facing the light source 14A of the indicator 14 and the other end portion of the fiber 66 is provided inside the frame portion 52. Light from the indicator 14 propagates inside the fiber 66 to be emitted to the inside of the frame portion 52.

OTHER EMBODIMENTS

Meanwhile, as described above, the indicator 14 of the camera 10 is provided with the power switch 15. Specifically, the upper surface 14B of the indicator 14 is provided with the power switch 15. The power switch 15 can emit light depending on the state of operation. The power switch 15 is an example of an "operation portion" according to the embodiment of the present disclosed technology.

In a case where the power switch 15 is accidentally operated by the user, the camera 10 may be turned off in a situation in which the user does not intend to turn off the camera 10 as in a situation in which the camera 10 is being used, a situation in which the camera 10 is in communication, or the like. Therefore, there is a case where a switch cover that suppresses the power switch 15 being erroneously operated is required to be provided.

As the related art regarding the switch cover, there is a switch cover consisting of a box-shaped frame that is quadrangular as seen in a plan view and a lid that opens and closes an opening defined by the frame. The switch cover is mounted to a camera such that a switch is accommodated in the box-shaped frame. The opening has a size enough for a finger of a user to be inserted therethrough. In a state where the switch cover is mounted to the camera, the opening is closed by the lid in a case where the switch is not to be operated. In addition, in a case where the switch is to be operated by the user, the lid is opened and a finger is inserted through the opening to press the switch. Accordingly, an erroneous operation performed by the user is suppressed in a state where the lid of the opening is closed. However, in the case of such a configuration, the switch cover needs to be provided with a lid opening and closing mechanism (for example, a hinge mechanism) and in a case where the lid opening and closing mechanism is provided, there may be a constraint on the degree of freedom of the design regarding the shape, the size, or the like of the switch cover. Particularly, in a case where a housing is small as in the case of the camera 10 according to the present embodiment, a body of the camera 10 is characteristic in terms of design, and there is a constraint on the shape and the size of the switch cover, it may be difficult to make the design of the switch cover match the design of the camera 10.

In addition, as another known related art regarding a switch cover, there is a cover that covers the entire switch and that consists of a soft resin. In a case where a user presses a switch and an external force equal to or greater than a certain external force is applied to the switch from a finger of the user in such a case, a switch cover is elastically deformed and the switch is pressed over the cover. Therefore, the switch cover is not deformed or the amount of deformation thereof is small in a case where a weak force is applied as in the case of light contact or the like, and thus an erroneous operation performed by the user is suppressed. However, the switch cover covering the entire switch has a problem as follows. That is, there is a type of camera switch that emits light depending on the state of operation. In a case where a switch having a light emitting function is to be covered with a switch cover that covers the entire switch, the switch cover needs to be formed of a light-transmitting material to secure light visibility regarding the color of the switch, and thus there is a constraint on the color. As with the above-described related art, the constraint on the color results in a constraint on the degree of freedom of the design of the switch cover.

Figure 13:
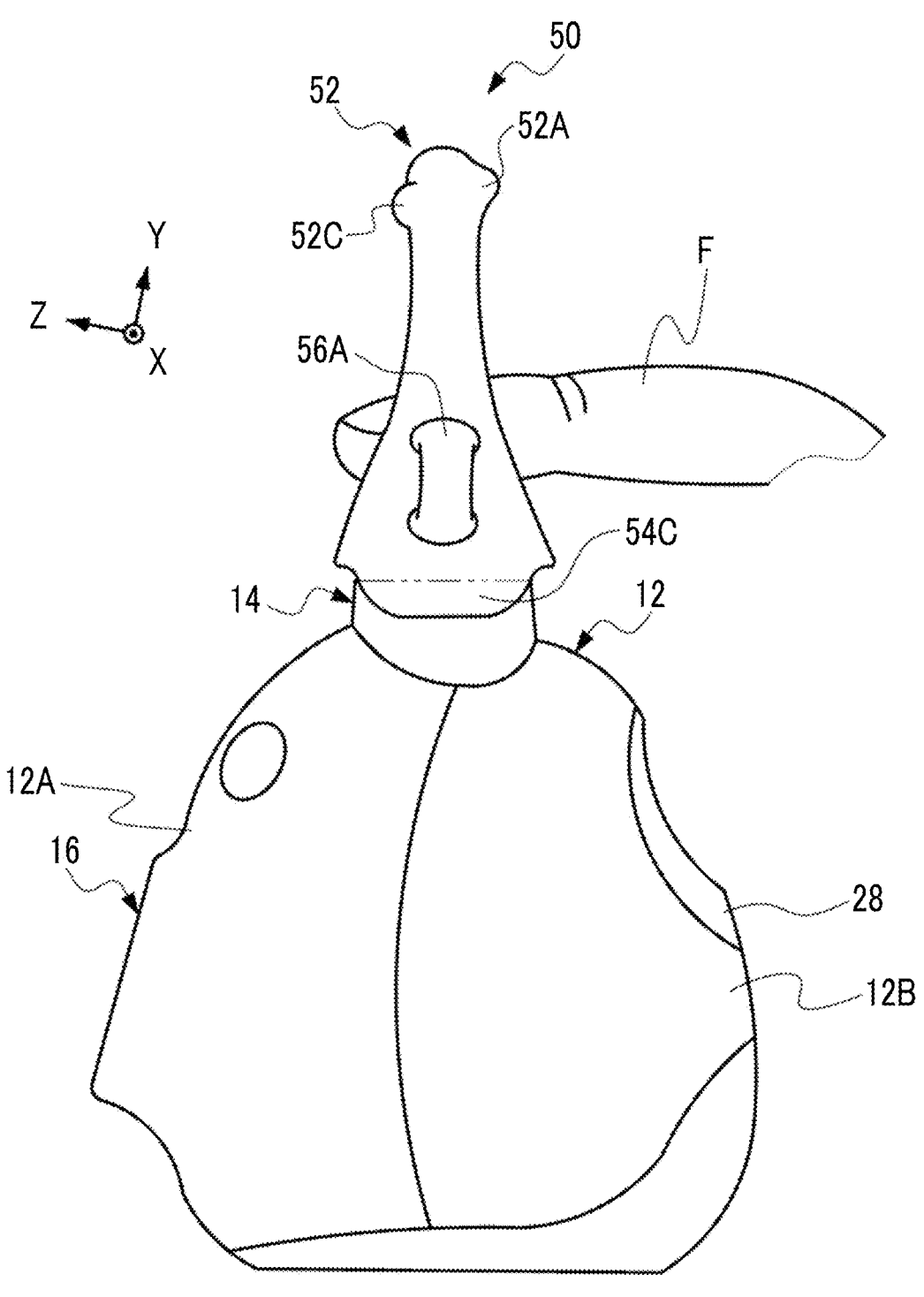
FIG. 13 is an enlarged view showing an example of the configuration of the camera system according to the embodiment.

Therefore, in the present embodiment, the accessory 50 is used as a switch cover. In other words, the accessory 50 also has a function as a switch cover. For example, description will be made about a state where the accessory 50 has been attached to the indicator 14 as shown in FIG. 13. A case where the user erroneously brings a finger F close to the power switch 15 from above the indicator 14 in such a state will be considered.

Figure 14:
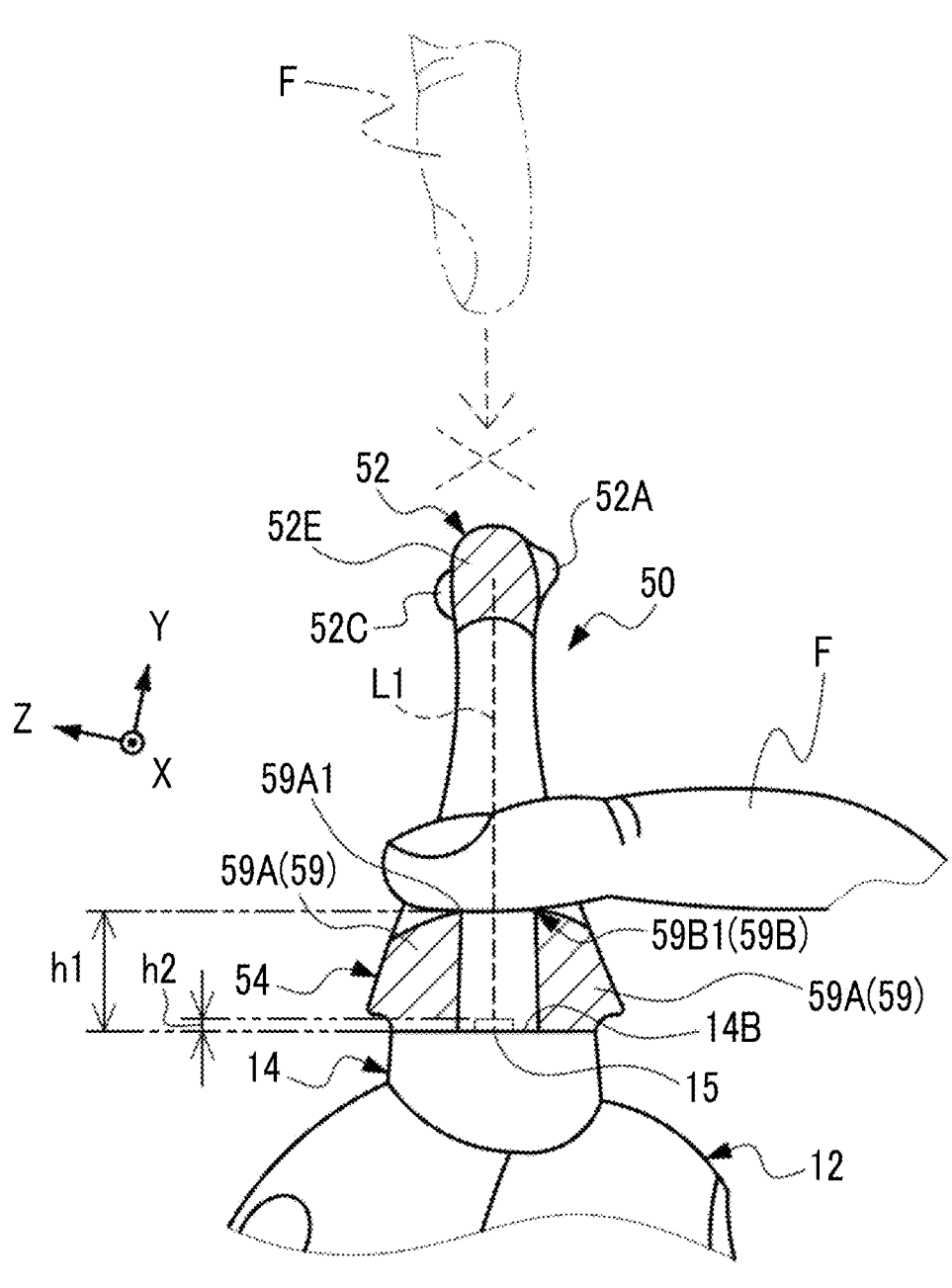
FIG. 14 is an enlarged view showing an example of the configuration of the camera system according to the embodiment.

In this case, for example, as shown in FIG. 14, the power switch 15 is provided in a state of protruding from one surface (here, the upper surface 14B of the indicator 14) of the camera 10. The accessory 50 includes a restriction portion 59. The restriction portion 59 restricts contact with respect to the power switch 15 in a state where the accessory 50 is mounted to the camera 10. The restriction portion 59 is an example of a "restriction portion" according to the embodiment of the present disclosed technology.

The restriction portion 59 is disposed at least in a portion of the vicinity of the power switch 15. In an example shown in FIG. 14, the restriction portion 59 is a peripheral wall 59A surrounding the power switch 15. The peripheral wall 59A is an example of a "peripheral wall" according to the embodiment of the present disclosed technology. In a state where the accessory 50 is attached to the indicator 14, a height h1 of the restriction portion 59 from the upper surface 14B of the indicator 14 is larger than a protrusion height h2 of the power switch 15. That is, the restriction portion 59 has a height larger than the protrusion amount of the power switch 15. Accordingly, in a case where the finger F approaches the power switch 15, the finger F comes into contact with a upper portion of the restriction portion 59 first, so that contact between the finger F and the power switch 15 is suppressed. As a result, erroneous contact between the finger F or the like and the power switch 15 is suppressed.

The restriction portion 59 has sufficient rigidity with respect to a pressing force applied by the user, and the height h1 of the restriction portion 59 is maintained at a height at which contact between the finger F and the power switch 15 can be suppressed even in a case where the restriction portion 59 is pressed by the finger F. That is, even in a case where the restriction portion 59 is pressed by the finger F, an opening region 59B is separated from the power switch 15 by a distance equal to or greater than a certain distance.

Figure 15:
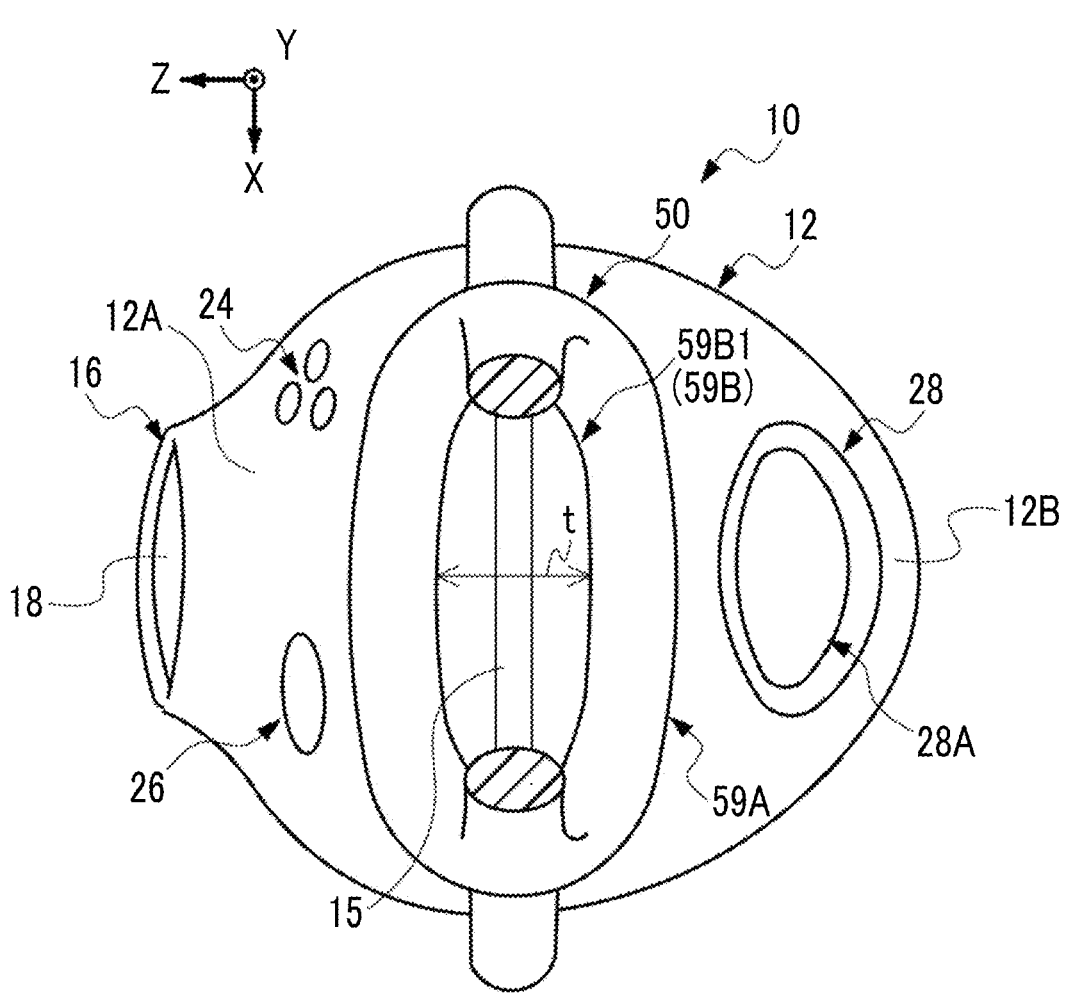
FIG. 15 is an enlarged view showing an example of the configuration of the camera system according to the embodiment.

For example, as shown in FIG. 15, in a plan view of the power switch 15 as seen from a top portion 59A1 of the restriction portion 59 in the height direction, the opening region 59B is formed at the restriction portion 59. In addition, the opening region 59B is formed to overlap with at least a portion of the power switch 15. Light emitted by the power switch 15 is transmitted through the opening region 59B. The top portion 59A1 is an example of a "top portion" according to the embodiment of the present disclosed technology and the opening region 59B is an example of an "opening region" according to the embodiment of the present disclosed technology.

As described above, the peripheral wall 59A surrounds the power switch 15. In an example shown in FIG. 15, the opening region 59B is one opening 59B1 defined by the peripheral wall 59A. The opening 59B1 is an example of an "opening" according to the embodiment of the present disclosed technology.

In addition, the opening region 59B has such a size that entrance of the finger F toward the power switch 15 can be suppressed. Here, the size of the finger F of the user refers to an average value of widths of index fingers of adults (here, a distance in a direction orthogonal to a longitudinal direction of a finger in a view of the finger as seen from the back of a hand), and particularly refers to an average value of widths of bases of nails (portions of nails closest to a first joint side) of index fingers. An opening region having such a size that entrance of the finger F can be suppressed is an opening region having a size equal to or smaller than the average value.

Here, the opening 59B1 is formed in an elliptical shape as seen in a plan view. A distance t in a minor axis direction of the opening 59B1 is a distance at which contact between the finger F and the power switch 15 can be suppressed, and is a distance at which the amount of light from the indicator 14 can be secured. For example, the distance t is equal to or smaller than 10 mm.

Note that, although the description has been made while using an example in which the opening 59B1 has an elliptical shape, the present disclosed technology is not limited thereto. The opening 59B1 may have an elongated shape. In addition, the opening 59B1 may have a rectangular shape. In this case, the distance t is a distance in a transverse direction of the rectangular shape.

In addition, the opening 59B1 is open to the outside. In other words, the inside of the opening 59B1 is not filled with a resin and a lid is not attached to the opening 59B1.

In addition, in a state where the accessory 50 is attached to the indicator 14, a member including a facing portion facing the opening region 59B is provided on an extension line L1 which is a straight line extending along the height direction of the restriction portion 59 from the power switch 15 to the opening 59B1.

In the example shown in FIG. 14, the frame portion 52 is provided above the restriction portion 59. As described above, for example, the frame portion 52 has an annular shape. An upper-side arc portion 52E of the frame portion 52 having the annular shape is provided at a position facing the opening 59B1. The frame portion 52 has an annular shape of which the radial direction is a direction along the straight line. The frame portion 52 is an example of a "member" according to the embodiment of the present disclosed technology, and the upper-side arc portion 52E is an example of a "facing portion" according to the embodiment of the present disclosed technology.

Since the arc portion 52E is provided, it is difficult to bring the finger F or the like close to the restriction portion 59 from above. For example, a case where the finger F approaches the opening 59B1 with a distal end of the finger F approaching the opening 59B1 first will be considered. In this case, the finger F and the upper-side arc portion 52E of a ring of the frame portion 52 interfere with each other above the restriction portion 59 (refer to FIG. 14). Therefore, the finger F is restricted from approaching the opening 59B1 in such a posture that the nail of the finger F is inserted into the opening 59B1 and thus erroneous contact between the power switch 15 and the finger F is suppressed.

According to the accessory 50 of the present embodiment, the camera 10 is provided with the power switch 15 and the accessory 50 is mounted to the camera 10. In addition, the accessory 50 is provided with the restriction portion 59. The restriction portion 59 has the height h1 larger than the protrusion amount h2 of the power switch 15. Furthermore, the restriction portion 59 is provided with the opening 59B1 that overlaps with a portion of the power switch 15 as seen in a plan view. The opening 59B1 has such a size that light of the power switch 15 is transmitted and the entrance of the user's finger can be suppressed.

Accordingly, even in a case where the finger F of the user is erroneously brought close to the power switch 15 in a state where the accessory 50 is mounted to the indicator 14, the finger F comes into contact with the restriction portion 59 first and thus contact between the finger F and the power switch 15 is suppressed. That is, it is not necessary to provide a lid for the opening 59B1, and the degree of freedom of the design (for example, the shape and the size) of the accessory 50 is improved. For example, it is possible to realize the design of the accessory 50 that matches the camera 10. In addition, since light from the power switch 15 is emitted to the outside through the opening 59B1, the degree of freedom in selecting the material of the restriction portion 59 is realized. For example, a material other than a transparent material can also be adopted.

In addition, even in a case where the restriction portion 59 is pressed by the finger F, the top portion 59A1 is separated from the power switch 15 by a distance equal to or greater than a certain distance. Accordingly, erroneous contact between the finger F or the like and the power switch 15 is suppressed. For example, although depending on a pressing force, the power switch 15 may be pressed over a cover even in the case of an operation performed unintentionally. In the present configuration, even in a case where the restriction portion 59 is pressed by the finger F, since a distance between the power switch 15 and the top portion 59A1 of the restriction portion 59 is sufficiently secured by the restriction portion 59, erroneous contact between the finger F and the power switch 15 is more suppressed.

In addition, according to the accessory 50 of the present embodiment, the restriction portion 59 is the peripheral wall 59A. The opening 59B1 is defined by the peripheral wall 59A. Accordingly, a force received from the finger F approaching the power switch 15 can be distributed and supported by the peripheral wall 59A, and approach in a plurality of directions such as frontward, rearward, leftward and rightward directions can be suppressed. As a result, the approach of the finger F to the power switch 15 is suppressed.

In addition, according to the accessory 50 of the present embodiment, the opening 59B1 is formed in an elliptical shape, and the distance t in the minor axis direction is equal to or smaller than 10 mm. In a case where the finger F comes into contact with the power switch 15, erroneous contact between the finger F and the power switch 15 is suppressed since it is generally difficult for a finger of a person to pass through a 10 mm gap and come into contact with the power switch 15.

In addition, according to the accessory 50 of the present embodiment, in a state where the accessory 50 has been attached, the frame portion 52 is provided above the restriction portion 59. The upper-side arc portion 52E of the frame portion 52 is provided at a position facing the opening region 59B. Accordingly, the posture of the finger F in which the nail of the finger F is inserted into the opening region 59B is restricted and thus erroneous contact between the power switch 15 and the finger F is suppressed.

In addition, according to the accessory 50 of the present embodiment, the frame portion 52 is an annular member that includes the upper-side arc portion 52E and of which the radial direction is a direction along the extension line L1. Accordingly, the configuration of the accessory 50 is simplified in comparison with a case where a member that restricts the posture of the finger F or the like is separately provided at a position facing the opening region 59B.

Note that in the above-described embodiment, the description has been made by using an example in which the opening 59B1 is formed as the opening region 59B. However, the present disclosed technology is not limited thereto. In the present modification example, a plurality of openings 59B2 are formed as the opening region 59B. The openings 59B2 are examples of a "plurality of openings" according to the embodiment of the present disclosed technology.

Figure 16:
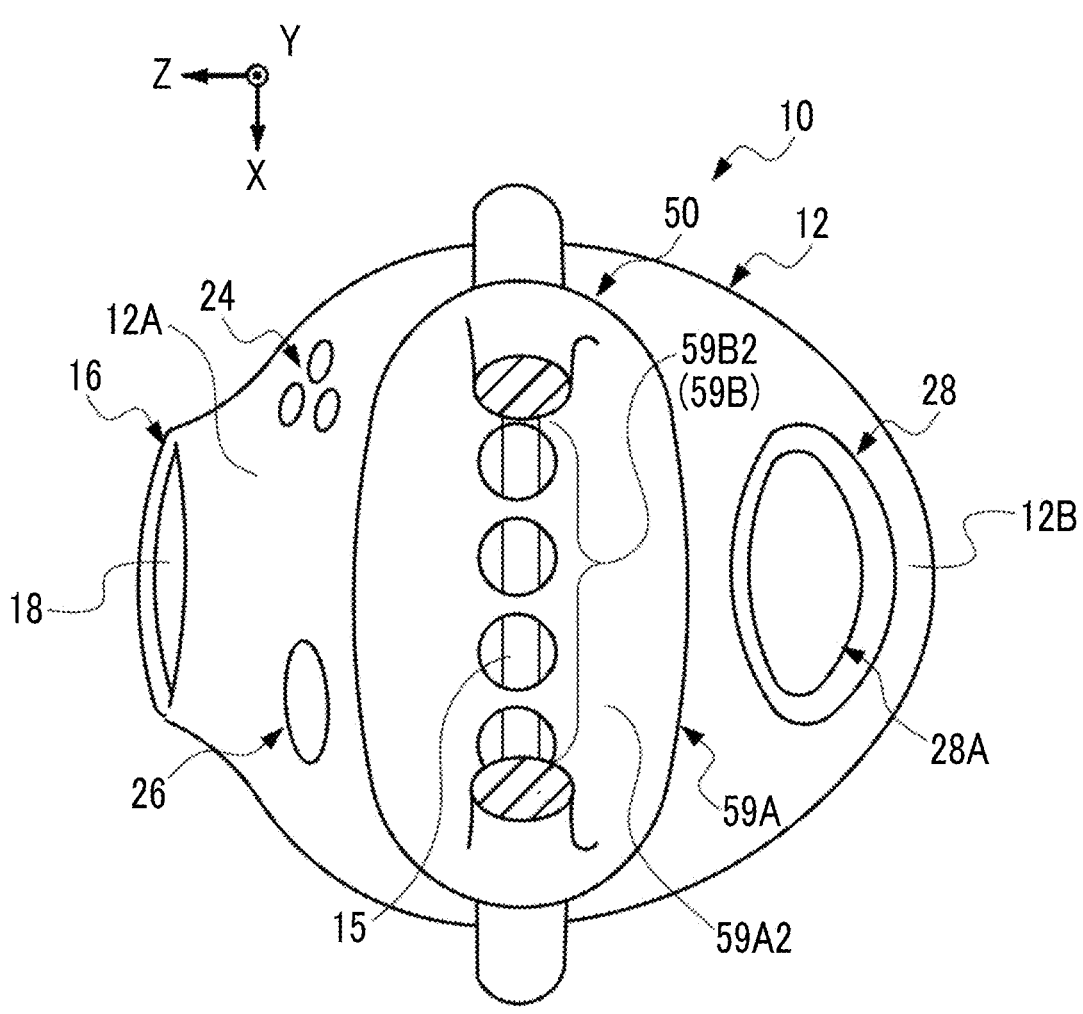
FIG. 16 is an enlarged view showing an example of the configuration of the camera system according to the embodiment.

For example, as shown in FIG. 16, a ceiling portion 59A2 is formed on the top portion 59A1 of the restriction portion 59. The ceiling portion 59A2 covers the power switch 15. The plurality of openings 59B2 are formed in the ceiling portion 59A2 as the opening region 59B. In an example shown in FIG. 16, four openings 59B2 are formed. The ceiling portion 59A2 is an example of a "ceiling portion" according to the embodiment of the present disclosed technology.

Light from the power switch 15 is transmitted through the plurality of openings 59B2. In addition, each of the plurality of openings 59B2 has such a size that entrance of the finger F can be suppressed. In the example shown in FIG. 16, each of the plurality of openings 59B2 is circular, and the diameter thereof is equal to or smaller than 10 mm.

As described above, in the present modification example, the ceiling portion 59A2 is formed on the restriction portion 59 and furthermore, the plurality of openings 59B2 are formed in the ceiling portion 59A2. Accordingly, even in a case where the finger F of the user is erroneously brought close to the power switch 15 in a state where the accessory 50 is mounted to the indicator 14, contact between the finger F of the user and the power switch 15 is more suppressed since the ceiling portion 59A2 covers the power switch 15. Furthermore, since the plurality of openings 59B2 are formed, the amount of light from the power switch 15 is secured.

In addition, in the above-described embodiment, the description has been made by using an example in which the indicator 14 is provided with the power switch 15. However, the present disclosed technology is not limited thereto. The indicator 14 may be provided with another switch and/or an operation dial may be provided instead of the power switch 15 or in addition to the power switch 15.

In addition, in the above-described embodiment, the peripheral wall 59A has been described as an example of the restriction portion 59. However, the present disclosed technology is not limited thereto. The restriction portion 59 may be a tubular body or a truncated conical body formed around the power switch 15 as long as contact between the finger F and the power switch 15 can be suppressed. In addition, the restriction portion 59 may be a collection of a plurality of columns disposed around the power switch 15.

In addition, in the above-described embodiment, the description has been made by using an example in which the opening 59B1 having an elliptical shape is formed in the restriction portion 59. However, the present disclosed technology is not limited thereto. The opening 59B1 may be a circular opening having a diameter equal to or smaller than 10 mm or may be a slit-shaped opening.

In addition, a target to which the accessory 50 as a switch cover is attached is not limited to the camera 10 and may be, for example, a small-size electronic apparatus or a toy.

In addition, in each of the above-described embodiments, the description has been made by using an example in which the accessory 50 is connected to the camera 10 via the string S. However, the present disclosed technology is not limited thereto. For example, the camera 10 may be connected by means (for example, a chain) other than the string S. In addition, the accessory 50 and the camera 10 do not need to be connected to each other, and the accessory 50 may be prepared in accordance with a scene in which the accessory 50 is required.

In addition, the accessory 50 may be sold in a set with the camera 10, or the user may obtain the accessory 50 sold separately from the camera 10.

In addition, in each of the above-described embodiments, the description has been made by using an example in which the frame portion 52 is an annular frame. However, the present disclosed technology is not limited thereto. For example, the frame portion 52 may have a rectangular shape.

In addition, in each of the above-described embodiments, the description has been made by using an example in which the housing 12 has an approximately egg-like rounded shape. However, the present disclosed technology is not limited thereto. The shape of the housing 12 may be a spherical shape, a spindle shape, or a quadrangular shape.

In addition, in each of the above-described embodiments, the description has been made by using an example in which the upper portion of the housing 12 of the camera 10 is provided with the indicator 14. However, the present disclosed technology is not limited thereto. The way in which the indicator 14 is disposed is not particularly limited, and for example, the indicator 14 may be provided on a right surface or a left surface of the housing 12.

In addition, in each of the above-described embodiments, the description has been made by using a case where the shutter button 28 is a physical button as an example. However, the present disclosed technology is not limited thereto. For example, the shutter button 28 may be displayed on a touch panel display.

In addition, in each of the above-described embodiments, the description has been made by using an example in which the first mounting guide portion 54B and the second mounting guide portion 54C of the mounting portion 54 hold the side surfaces of the indicator 14 in a case where the accessory 50 is attached to the indicator 14. However, the present disclosed technology is not limited thereto. The accessory 50 only needs to be attachable to and detachable from the indicator 14 via the mounting portion 54.

For example, a protrusion provided at the mounting portion 54 may be fitted into a recess portion provided at the indicator 14 so that the mounting portion 54 is attached. In this case, the user can check that the accessory 50 is attached to the indicator 14 by the click feeling felt when the indicator 14 is fitted.

In addition, in a case where the accessory 50 is to be attached to the indicator 14, the accessory 50 may be attached to the indicator 14 from above and then an operation of rotating (that is, an operation of twisting) the accessory 50 in a direction orthogonal to a direction in which the accessory 50 is attached may be performed so that the accessory 50 is fixed to the indicator 14. In addition, for example, the mounting portion 54 may be provided with a clip mechanism and the accessory 50 may be attached with the indicator 14 gripped by a claw of the clip mechanism.

Contents described and illustrated above are for detailed description of a part according to the present disclosed technology and are merely an example of the present disclosed technology. For example, description of the above-described configurations, functions, actions, and effects is description related to an example of configurations, functions, actions, and effects of parts related to the present disclosed technology. Therefore, it is a matter of course that an unnecessary part of the contents described and illustrated above may be deleted, a new element may be added, and replacement may be made without departing from the spirit of the present disclosed technology. In addition, in order to avoid complication and facilitate the understanding of a portion according to the present disclosed technology, regarding the contents described and illustrated above, description related to common technical knowledge or the like which does not need to be described to enable implementation of the present disclosed technology has been omitted.

In the present specification, "A and/or B" has the same meaning as "at least one of A or B". That is, "A and/or B" means "A, B, or a combination of A and B". In addition, in the present specification, the same concept as in the case of "A and/or B" applies to a case where three or more matters are expressed together by "and/or".

All publications, patent applications, and technical standards described in the present specification are incorporated herein by reference to the same extent as if each publication, patent application, or technical standard was specifically and individually indicated to be incorporated by reference.

Mainly regarding the above-described embodiments up to the second modification example, the following supplementary notes will be further disclosed.

First Supplementary Note 1

A camera system including:

a camera including a light emitting unit that is able to perform notification about information on the camera by means of light emission; and an attachment that is mountable to the camera, in which the attachment functions as a finder used to check an imaging range of the camera in a state where the attachment is mounted to the camera, and in a case where the attachment is mounted, an inside of a frame of the finder is irradiatable with light from the light emitting unit.

First Supplementary Note 2

The camera system according to First Supplementary Note 1, in which a through-hole is formed in the attachment at a mounting portion with respect to the camera, and the light from the light emitting unit passes through the through-hole, so that the inside is irradiatable with the light from the light emitting unit.

First Supplementary Note 3

The camera system according to First Supplementary Note 1, in which at least a portion of the attachment is formed of a light-transmitting material, so that the inside is irradiatable with the light from the light emitting unit.

First Supplementary Note 4

The camera system according to First Supplementary Note 1, in which the attachment includes a light guide member that guides the light from the light emitting unit by causing the light to propagate in the light guide member, and the inside is irradiatable with the light from the light emitting unit via the light guide member.

First Supplementary Note 5

The camera system according to any one of First Supplementary Notes 1 to 4, in which the frame of the attachment is a guide used to check the imaging range, and the attachment functions as a simple finder that does not include a lens.

First Supplementary Note 6

The camera system according to any one of First Supplementary Notes 1 to 5, in which the attachment has a second function different from a first function, the first function being a function as the finder.

First Supplementary Note 7

The camera system according to First Supplementary Note 6, in which the second function is a function as a stand on which the camera is placeable.

First Supplementary Note 8

The camera system according to First Supplementary Note 7, in which the camera is placeable on the stand in a posture in which an optical axis of the camera is inclined with respect to a horizontal direction.

First Supplementary Note 9

The camera system according to First Supplementary Note 8, in which the stand has such a shape that an inclination angle of the optical axis with respect to the horizontal direction is adjustable.

First Supplementary Note 10

The camera system according to First Supplementary Note 9, in which a height of the frame from a surface on which the stand is installed differs in a circumferential direction of the frame, so that the inclination angle is adjustable.

First Supplementary Note 11

The camera system according to any one of First Supplementary Notes 7 to 9, in which the frame of the attachment is a guide used to check the imaging range, the attachment includes a plurality of supporting protrusions that serve as a plurality of support points at which the camera is supported in a case where the attachment is used as the stand, and the supporting protrusions are disposed on the frame.

First Supplementary Note 12

The camera system according to any one of First Supplementary Notes 1 to 10, in which the camera has a communication function, and the light emitting unit functions as an indicator indicating that the camera is in communication.

First Supplementary Note 13

The camera system according to any one of First Supplementary Notes 1 to 11, in which the light emitting unit is disposed at a position at which light emitted by the light emitting unit is visually recognizable for a user in a state where the user looks through the finder mounted to the camera.

Regarding the above-described embodiments and other embodiments, the following supplementary notes will be disclosed.

Second Supplementary Note 1

An attachment attachably and detachably provided at a camera provided with an operation portion that emits light in accordance with a state of operation, the operation portion being provided in a state of protruding from one surface of the camera, the attachment including:

a restriction portion that is disposed in at least a portion of a vicinity of the operation portion in a state where the attachment is mounted to the camera, of which a height is larger than a protrusion amount of the operation portion, and that restricts contact with respect to the operation portion, in which the restriction portion is provided with an opening region that overlaps with at least a portion of the operation portion as seen in a plan view of the operation portion seen from a top portion of the restriction portion in a height direction, and the opening region has such a size that the light emitted by the operation portion passes through the opening region and entrance of a user's finger moving toward the operation portion is suppressible.

Second Supplementary Note 2

The attachment according to Second Supplementary Note 1, in which the restriction portion is a peripheral wall that surrounds the operation portion, and the opening region is one opening defined by the peripheral wall.

Second Supplementary Note 3

The attachment according to Second Supplementary Note 2, in which, in a case where the opening is formed in any one of a rectangular shape, an elliptical shape, or an elongated shape, a width of the opening in a transverse direction or a minor axis direction is equal to or smaller than 10 mm.

Second Supplementary Note 4

The attachment according to Second Supplementary Note 1 or 2, in which a ceiling portion that covers the operation portion is formed on the top portion of the restriction portion, and the opening region is a plurality of openings formed in the ceiling portion.

Second Supplementary Note 5

The attachment according to any one of Second Supplementary Notes 1 to 4, in which a member including a facing portion facing the opening region is provided on an extension line which is a straight line extending along the height direction from the operation portion to the opening region.

Second Supplementary Note 6

The attachment according to Second Supplementary Note 5, in which the member is an annular member that partially includes the facing portion and of which a radial direction is a direction along the extension line.

What is claimed is:

1. A camera system comprising:

a camera including a light emitting unit that is able to perform notification about information on the camera by means of light emission, the camera not being provided with a display unit used to check a captured subject image; and an attachment that is mountable to the camera, wherein the attachment functions as a finder used to check an imaging range of the camera in a state where the attachment is mounted to the camera, wherein a through-hole is formed in the attachment at a mounting portion with respect to the camera, and in a case where the attachment is mounted, light from the light emitting unit passes through the through-hole, so that an inside of a frame of the finder is irradiatable with the light from the light emitting unit, wherein the attachment has a second function different from a first function, the first function being a function as the finder, wherein the second function is a function as a stand on which the camera is placeable, and wherein the camera is placeable on the stand in a posture in which an optical axis of the camera is inclined with respect to a horizontal direction.

2. The camera system according to claim 1, wherein the frame of the attachment is a guide used to check the imaging range, and the attachment functions as a simple finder that does not include a lens.

3. The camera system according to claim 1, wherein the stand has such a shape that an inclination angle of the optical axis with respect to the horizontal direction is adjustable.

4. The camera system according to claim 3, wherein a height of the frame from a surface on which the stand is installed differs in a circumferential direction of the frame, so that the inclination angle is adjustable.

5. The camera system according to claim 1, wherein the frame of the attachment is a guide used to check the imaging range, the attachment includes a plurality of supporting protrusions that serve as a plurality of support points at which the camera is supported in a case where the attachment is used as the stand, and the supporting protrusions are disposed on the frame.

6. The camera system according to claim 1, wherein the camera has a communication function, and the light emitting unit functions as an indicator indicating that the camera is in communication.

7. The camera system according to claim 1, wherein the light emitting unit is disposed at a position at which light emitted by the light emitting unit is visually recognizable for a user in a state where the user looks through the finder mounted to the camera.

8. An attachment mountable to a camera including a light emitting unit that is able to perform notification about information on the camera by means of light emission, the camera not being provided with a display unit used to check a captured subject image, wherein the attachment functions as a finder used to check an imaging range of the camera in a state where the attachment is mounted to the camera, wherein a through-hole is formed in the attachment at a mounting portion with respect to the camera, and in a case where the attachment is mounted, light from the light emitting unit passes through the through-hole, so that an inside of a frame of the finder is irradiatable with the light from the light emitting unit, wherein the attachment has a second function different from a first function, the first function being a function as the finder, wherein the second function is a function as a stand on which the camera is placeable, and wherein the camera is placeable on the stand in a posture in which an optical axis of the camera is inclined with respect to a horizontal direction.

* * * * *